United States Patent
Izhikevich et al.

(10) Patent No.: US 9,630,317 B2
(45) Date of Patent: Apr. 25, 2017

(54) LEARNING APPARATUS AND METHODS FOR CONTROL OF ROBOTIC DEVICES VIA SPOOFING

(71) Applicant: BRAIN CORPORATION, San Diego, CA (US)

(72) Inventors: Eugene M. Izhikevich, San Diego, CA (US); Patryk Laurent, San Diego, CA (US); Micah Richert, San Diego, CA (US); Csaba Petre, San Diego, CA (US)

(73) Assignee: Brain Corporation, San Diego, CA (US)

( * ) Notice: Subject to any disclaimer, the term of this patent is extended or adjusted under 35 U.S.C. 154(b) by 55 days.

(21) Appl. No.: 14/244,888

(22) Filed: Apr. 3, 2014

(65) Prior Publication Data
US 2015/0283702 A1 Oct. 8, 2015

(51) Int. Cl.
G06F 19/00 (2011.01)
G05B 19/18 (2006.01)
(Continued)

(52) U.S. Cl.
CPC ............. B25J 9/163 (2013.01); B25J 9/161 (2013.01); G05D 1/0022 (2013.01);
(Continued)

(58) Field of Classification Search
USPC .................................................. 700/245–264
See application file for complete search history.

(56) References Cited

U.S. PATENT DOCUMENTS 5,046,022 A * 9/1991 Conway ............... G05B 19/427
700/250
5,063,603 A 11/1991 Burt
(Continued)

FOREIGN PATENT DOCUMENTS

CN 102226740 10/2011
JP 4087423 3/1992
(Continued)

OTHER PUBLICATIONS

Abbott et al. (2000), "Synaptic plasticity: taming the beast", Nature Neuroscience, 3, 1178-1183.
(Continued)

*Primary Examiner* — Bhavesh V Amin
(74) *Attorney, Agent, or Firm* — Gazdzinski & Associates, PC

(57) ABSTRACT

Robotic devices may be operated by users remotely. A learning controller apparatus may detect remote transmissions comprising user control instructions. The learning apparatus may receive sensory input conveying information about robot's state and environment (context). The learning apparatus may monitor one or more wavelength (infrared light, radio channel) and detect transmissions from user remote control device to the robot during its operation by the user. The learning apparatus may be configured to develop associations between the detected user remote control instructions and actions of the robot for given context. When a given sensory context occurs, the learning controller may automatically provide control instructions to the robot that may be associated with the given context. The provision of control instructions to the robot by the learning controller may obviate the need for user remote control of the robot thereby enabling autonomous operation by the robot.

29 Claims, 21 Drawing Sheets

(51) Int. Cl.
  *B25J 9/16* (2006.01)
  *G06N 3/00* (2006.01)
  *G05D 1/00* (2006.01)
  *G05D 1/02* (2006.01)
  *G06N 3/04* (2006.01)
  *G06N 99/00* (2010.01)

(52) U.S. Cl.
  CPC ......... *G05D 1/0088* (2013.01); *G05D 1/0246* (2013.01); *G06N 3/008* (2013.01); *G05D 2201/02* (2013.01); *G06N 3/049* (2013.01); *G06N 99/005* (2013.01)

(56) References Cited

U.S. PATENT DOCUMENTS

| | | | |
|---|---|---|---|
| 5,079,491 A * | 1/1992 | Nose | G05B 19/4148 318/567 |
| 5,092,343 A | 3/1992 | Spitzer | |
| 5,245,672 A | 9/1993 | Wilson | |
| 5,355,435 A | 10/1994 | DeYong | |
| 5,388,186 A | 2/1995 | Bose | |
| 5,408,588 A | 4/1995 | Ulug | |
| 5,467,428 A | 11/1995 | Ulug | |
| 5,638,359 A | 6/1997 | Peltola | |
| 5,673,367 A | 9/1997 | Buckley | |
| 5,875,108 A | 2/1999 | Hoffberg | |
| 5,937,143 A * | 8/1999 | Watanabe | B25J 9/1671 700/264 |
| 6,009,418 A | 12/1999 | Cooper | |
| 6,014,653 A | 1/2000 | Thaler | |
| 6,363,369 B1 | 3/2002 | Liaw | |
| 6,458,157 B1 | 10/2002 | Suaning | |
| 6,545,705 B1 | 4/2003 | Sigel | |
| 6,545,708 B1 | 4/2003 | Tamayama et al. | |
| 6,546,291 B2 | 4/2003 | Merfeld | |
| 6,581,046 B1 | 6/2003 | Ahissar | |
| 6,643,627 B2 | 11/2003 | Liaw | |
| 7,164,971 B2 * | 1/2007 | Ferla | B25J 13/06 700/247 |
| 7,395,251 B2 | 7/2008 | Linsker | |
| 7,426,501 B2 | 9/2008 | Nugent | |
| 7,672,920 B2 | 3/2010 | Ito | |
| 7,849,030 B2 | 12/2010 | Ellingsworth | |
| 7,937,164 B2 * | 5/2011 | Samardzija | G05B 23/021 700/108 |
| 7,945,349 B2 * | 5/2011 | Svensson | B25J 9/1671 700/254 |
| 7,970,492 B2 * | 6/2011 | Matsushima | B25J 9/1671 700/245 |
| 8,015,130 B2 | 9/2011 | Matsugu | |
| 8,315,305 B2 | 11/2012 | Petre | |
| 8,467,623 B2 | 6/2013 | Izhikevich | |
| 8,494,677 B2 * | 7/2013 | Mizutani | G05B 19/423 700/245 |
| 8,600,166 B2 | 12/2013 | Adhikari | |
| 9,111,441 B2 | 8/2015 | Yano et al. | |
| 2002/0038294 A1 | 3/2002 | Matsugu | |
| 2003/0050903 A1 | 3/2003 | Liaw | |
| 2004/0056625 A1 * | 3/2004 | Sano | B25J 13/065 318/568.12 |
| 2004/0102862 A1 * | 5/2004 | Kato | B23P 19/107 700/95 |
| 2004/0136439 A1 | 7/2004 | Dewberry | |
| 2004/0153211 A1 * | 8/2004 | Kamoto | A63H 11/00 700/245 |
| 2004/0193670 A1 | 9/2004 | Langan | |
| 2004/0225416 A1 * | 11/2004 | Kubota | B60R 16/0231 701/1 |
| 2005/0015351 A1 | 1/2005 | Nugent | |
| 2005/0036649 A1 | 2/2005 | Yokono | |
| 2005/0149227 A1 * | 7/2005 | Peters, II | B25J 9/161 700/245 |
| 2005/0283450 A1 | 12/2005 | Matsugu | |
| 2006/0094001 A1 | 5/2006 | Torre | |
| 2006/0145647 A1 * | 7/2006 | Kitatsuji | B25J 9/1682 318/568.11 |
| 2006/0161218 A1 | 7/2006 | Danilov | |
| 2007/0022068 A1 | 1/2007 | Linsker | |
| 2007/0053513 A1 | 3/2007 | Hoffberg et al. | |
| 2007/0176643 A1 | 8/2007 | Nugent | |
| 2007/0208678 A1 | 9/2007 | Matsugu | |
| 2007/0276690 A1 | 11/2007 | Ohtani et al. | |
| 2007/0290885 A1 | 12/2007 | Tanabe et al. | |
| 2008/0100482 A1 | 5/2008 | Lazar | |
| 2009/0043722 A1 | 2/2009 | Nugent | |
| 2009/0287624 A1 | 11/2009 | Rouat | |
| 2010/0036457 A1 | 2/2010 | Sarpeshkar | |
| 2010/0081958 A1 | 4/2010 | She | |
| 2010/0086171 A1 | 4/2010 | Lapstun | |
| 2010/0166320 A1 | 7/2010 | Paquier | |
| 2010/0225824 A1 | 9/2010 | Lazar | |
| 2011/0016071 A1 | 1/2011 | Guillen | |
| 2011/0119214 A1 | 5/2011 | Breitwisch | |
| 2011/0119215 A1 | 5/2011 | Elmegreen | |
| 2011/0208355 A1 | 8/2011 | Tsusaka | |
| 2012/0011090 A1 | 1/2012 | Tang | |
| 2012/0079866 A1 * | 4/2012 | Kuwayama | B21D 7/12 72/342.6 |
| 2012/0109866 A1 | 5/2012 | Modha | |
| 2012/0209428 A1 * | 8/2012 | Mizutani | G05B 19/423 700/250 |
| 2012/0265370 A1 | 10/2012 | Kim et al. | |
| 2012/0303091 A1 | 11/2012 | Izhikevich | |
| 2012/0308076 A1 | 12/2012 | Piekniewski | |
| 2012/0308136 A1 | 12/2012 | Izhikevich | |
| 2013/0073484 A1 | 3/2013 | Izhikevich | |
| 2013/0073491 A1 | 3/2013 | Izhikevich | |
| 2013/0073492 A1 | 3/2013 | Izhikevich | |
| 2013/0073495 A1 | 3/2013 | Izhikevich | |
| 2013/0073496 A1 | 3/2013 | Szatmary | |
| 2013/0073498 A1 | 3/2013 | Izhikevich | |
| 2013/0073499 A1 | 3/2013 | Izhikevich | |
| 2013/0073500 A1 | 3/2013 | Szatmary | |
| 2013/0151448 A1 | 6/2013 | Ponulak | |
| 2013/0151449 A1 | 6/2013 | Ponulak | |
| 2013/0151450 A1 | 6/2013 | Ponulak | |
| 2013/0218821 A1 | 8/2013 | Szatmary | |
| 2013/0251278 A1 | 9/2013 | Izhikevich | |
| 2013/0272570 A1 | 10/2013 | Sheng et al. | |
| 2013/0297542 A1 | 11/2013 | Piekniewski | |
| 2013/0310977 A1 * | 11/2013 | Tsusaka | B25J 9/1656 700/257 |
| 2013/0325768 A1 | 12/2013 | Sinyavskiy | |
| 2013/0325773 A1 | 12/2013 | Sinyavskiy | |
| 2013/0325775 A1 | 12/2013 | Sinyavskiy | |
| 2013/0325776 A1 | 12/2013 | Ponulak | |
| 2013/0325777 A1 | 12/2013 | Petre | |
| 2013/0326839 A1 | 12/2013 | Cho et al. | |
| 2014/0012788 A1 | 1/2014 | Piekniewski | |
| 2014/0079297 A1 | 3/2014 | Tadayon et al. | |
| 2014/0081895 A1 | 3/2014 | Coenen | |
| 2014/0114477 A1 * | 4/2014 | Sato | B25J 9/1664 700/250 |
| 2014/0116469 A1 | 5/2014 | Kim et al. | |
| 2016/0075015 A1 | 3/2016 | Izhikevich et al. | |
| 2016/0243701 A1 | 8/2016 | Gildert et al. | |

FOREIGN PATENT DOCUMENTS

| | | |
|---|---|---|
| RU | 2108612 C1 | 10/1998 |
| WO | 2008083335 | 7/2008 |

OTHER PUBLICATIONS

Bohte, "Spiking Nueral Networks" Doctorate at the University of Leiden, Holland, Mar. 5, 2003, pp. 1-133 [retrieved on Nov. 14, 2012]. Retrieved from the internet: <URL: http://homepages.cwi.nl/-sbohte/publication/phdthesis.pdf>.

(56) References Cited

OTHER PUBLICATIONS

Brette et al., Brain: a simple and flexible simulator for spiking neural networks, The Neuromorphic Engineer, Jul. 1, 2009, pp. 1-4, doi: 10.2417/1200906.1659.
Cessac et al. "Overview of facts and issues about neural coding by spikes." Journal of Physiology, Paris 104.1 (2010): 5.
Cuntz et al., "One Rule to Grow Them All: A General Theory of Neuronal Branching and Its Paractical Application" PLOS Computational Biology, 6 (8), Published Aug. 5, 2010.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.
Dorval et al. "Probability distributions of the logarithm of interspike intervals yield accurate entropy estimates from small datasets." Journal of neuroscience methods 173.1 (2008): 129.
Fidjeland et al. "Accelerated Simulation of Spiking Neural Networks Using GPUs" WCCI 2010 IEEE World Congress on Computational lntelligience, Jul. 18-23, 2010—CCIB, Barcelona, Spain, pp. 536-543, [retrieved on Nov. 14, 2012]. Retrieved from the Internet: <URL:http://www.doc.ic.ac.ukl-mpsha/IJCNN10b.pdf>.
Floreano et al., "Neuroevolution: from architectures to learning" Evol. Intel. Jan. 1, 2008:47-62, [retrieved Dec. 30, 2013] [retrieved online from URL:<http://inforscience.epfl.ch/record/112676/files/FloreanoDuerrMattiussi2008.pdf>.
Gewaltig et al., NEST (Neural Simulation Tool), Scholarpedia, 2007, pp. 1-15, 2( 4 ): 1430, doi: 1 0.4249/scholarpedia.1430.
Gleeson et al., ) NeuroML: A Language for Describing Data Driven Models of Neurons and Networks with a High Degree of Biological Detail, PLoS Computational Biology, Jun. 2010, pp. 1-19 vol. 6 Issue 6.
Gollisch et al. "Rapid neural coding in the retina with relative spike latencies." Science 319.5866 (2008): 11 08-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.
Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.
Harmony Ultimate User Guide, Version 4, pp. 1-54, Oct. 31, 2013.
Izhikevich, "Polychronization: Computation with Spikes", Neural Computation, 25, 2006, 18, 245-282.
Izhikevich et al., "Relating STDP to BCM", Neural Computation (2003) 15, 1511-1523.
Izhikevich, "Simple Model of Spiking Neurons", IEEE Transactions on Neural Networks, vol. 14, No. 6, Nov. 2003, pp. 1569-1572.
Jin et al. (2010) "Implementing Spike-Timing-Dependent Plasticity on SpiNNaker Neuromorphic Hardware", WCCI 2010, IEEE World Congress on Computational Intelligence.
Karbowski et al., "Multispikes and Synchronization in a Large Neural Network with Temporal Delays", Neural Computation 12, 1573-1606 (2000)).
Khotanzad, "Classification of invariant image representations using a neural network" IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.
Laurent, "The Neural Network Query Language (NNQL) Reference" [retrieved on Nov. 12, 2013]. Retrieved from the Internet: <URL https://code.google.com/p/nnql/issues/detail?id=1>.
Laurent, "Issue 1—nnql—Refactor Nucleus into its own file—Neural Network Query Language" [retrieved on Nov. 12, 2013]. Retrieved from the Internet: <URL:https:1/code.google.com/p/nnql/issues/detail?id=1 >.
Lazar et al. "A video time encoding machine", in Proceedings of the 15th IEEE International Conference on Image Processing (ICIP '08}, 2008, pp. 717-720.
Lazar et al. "Consistent recovery of sensory stimuli encoded with MIMO neural circuits." Computational intelligence and neuroscience (2010): 2.
Lazar et al. "Multichannel time encoding with integrate-and-fire neurons." Neurocomputing 65 (2005): 401-407.
Masquelier, Timothee. "Relative spike time coding and STOP-based orientation selectivity in the early visual system in natural continuous and saccadic vision: a computational model." Journal of computational neuroscience 32.3 (2012): 425-441.
Nichols, A Reconfigurable Computing Architecture for Implementing Artificial Neural Networks on FPGA, Master's Thesis, The University of Guelph, 2003, pp. 1-235.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.
Sato et al., "Pulse interval and width modulation for video transmission." Cable Television, IEEE Transactions on 4 (1978): 165-173.
Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.
Simulink® model [online], [Retrieved on Dec. 10, 2013] Retrieved from <URL: http://www.mathworks.com/products/simulink/index.html>.
Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8.
Szatmary et al., "Spike-timing Theory of Working Memory" PLoS Computational Biology, vol. 6, Issue 8, Aug. 19, 2010 [retrieved on Dec. 30, 2013]. Retrieved from the Internet: <URL:http://www.ploscompbiol.org/article/info%3Adoi%2F10.1371%2Fjournal.pcbi.1000879#>.
Wang "The time dimension for scene analysis." Neural Networks, IEEE Transactions on 16.6 (2005): 1401-1426.
Sjostrom et al., "Spike-Timing Dependent Plasticity" Scholarpedia, 5(2):1362 (2010), pp. 1-18.

\* cited by examiner

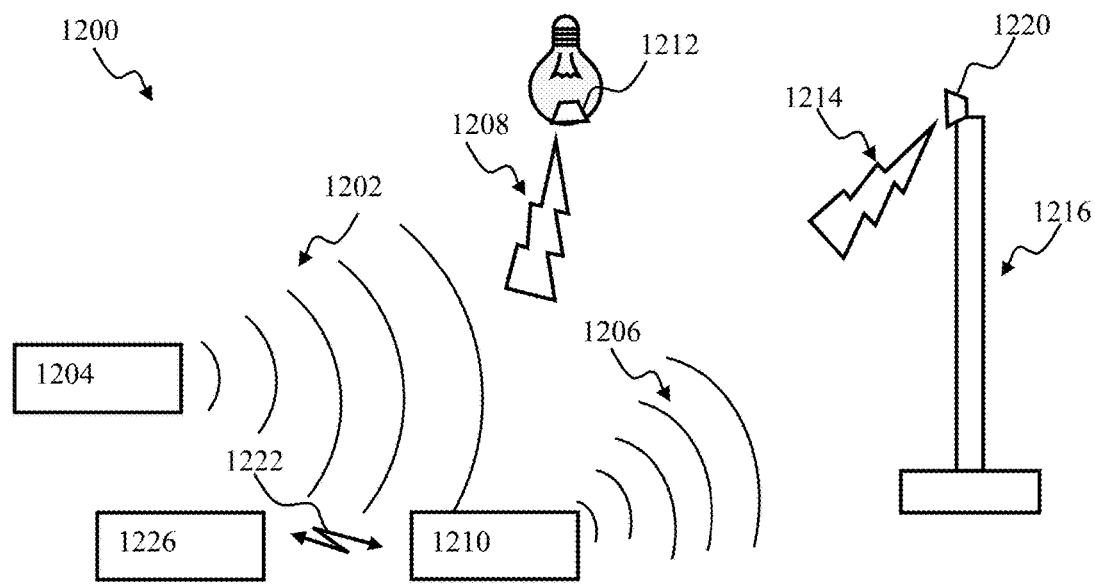
FIG. 12
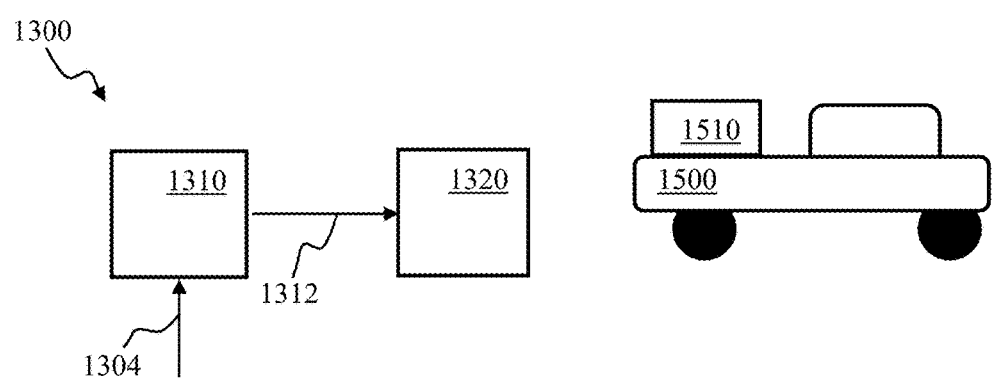
FIG. 13  FIG. 15

```
1.  if robot_name=='robome':
2.    codes['left']='6500,850,800,850,800,4250,800,850,750'
3.    codes['right']='6550,850,800,850,800,4250,800,4300,750'
4.    codes['forward']='6550,800,800,850,800,850,800,850,700'
5.    codes['backward']='6550,800,850,800,800,850,800,4300,750'
6.    codes['forward'+self.stop_string]='6550,4250,800,4300,800,4300,800,4250,800'
7.    codes['right'+self.stop_string]='6450,4400,800,4250,800,4250,850,4250,800'
8.    codes['left'+self.stop_string]='6450,900,750,900,700,4400,650,1000,650'
9.    codes['backward'+self.stop_string]='6350,4400,750,4300,750,4350,700,4350,850'

10.     elif robot_name=='donald_duck_car':
11.       codes['forward']='2750,400,250,800,650,350,300,750,700,350,650,350,650,400,650,350,650,350,300,750,650,400,250,800,650,350,300,750,250,800,250,800,300'
12.       codes['backward']='2800,350,300,750,700,300,650,400,250,750,700,350,650,350,700,350,650,350,300,750,650,400,650,350,250,800,300,750,250,800,300,750,300'
13.       codes['right']='2800,350,300,750,650,400,250,800,600,400,650,400,250,750,650,400,650,350,300,750,700,350,200,850,250,800,650,350,650,400,200,850,250'
14.       codes['left']='2800,400,250,800,600,400,250,800,650,400,250,800,650,350,650,350,650,400,200,850,650,350,250,800,250,800,650,400,250,800,250,750,300'
15.       codes['backleft']='2800,350,250,800,650,350,700,350,250,800,250,800,650,350,700,300,650,400,250,800,650,350,300,750,650,400,650,350,300,750,300,750,300'
16.       codes['backright']='2800,400,250,800,650,350,650,350,300,800,600,400,300,750,650,350,650,400,200,850,650,350,250,800,700,350,600,400,650,400,300,750,250'
17.       codes[self.stop_any_string]='2800,350,300,750,650,350,700,350,650,350,700,350,650,350,700,350,650,350,250,800,650,350,650,400,650,350,300,750,300,750,250,800,250'

18.     elif robot_name=='tmnt_truck':
19.       codes['forward']='7600,4450,500,1600,550,650,550,1550,550,650,550,600,450,750,550,650,500,1600,8700'
20.       codes['backward']='7600,4400,450,1700,550,650,400,1700,550,650,500,650,550,650,500,1600,450,700,8800'
21.       codes['right']='7600,4400,450,1700,550,600,450,750,550,650,500,1600,550,650,550,650,550,1550,8700'
22.       codes['left']='7600,4400,500,1650,500,650,500,650,450,750,550,650,550,1550,550,650,500,1600,8750'
23.       codes[self.stop_any_string]='7600,4400,550,1600,400,750,600,600,550,650,500,650,550,650,500,650,450,700,8700'

24.     elif robot_name=='inchwm_a':
```

FIG. 17A

```
25.     codes['left']='1900,600,1950,1000,400,1550,400,1550,400,600
       ,400,600,350,650,350,650,350,650,350,1600,300,1650,350,1600,350'
26.     codes['right']='1900,550,1900,1050,300,700,300,700,350,1600
       ,350,650,300,750,250,1650,350,1650,250,750,250,1700,250,1650,300'
27.     codes['forward']='1950,600,1850,1100,300,1650,300,700,300,7
       00,250,700,350,700,300,650,250,1700,300,1700,250,1700,250,1700,30
       0'
28.     codes['forwardleft']='1950,550,1950,1000,400,1600,350,600,4
       00,1600,400,600,350,600,400,600,400,1600,400,600,300,1650,350,160
       0,350'
29.     codes['forwardright']='1950,550,1950,1000,400,600,400,1550,
       400,1600,350,650,350,600,400,1600,350,650,350,650,400,1550,350,16
       00,350'
30.     codes['backward']='1950,550,1900,1100,300,700,250,1700,300,
       700,300,700,250,700,350,1600,300,700,300,1650,300,1700,250,1700,2
       50'
31.     codes['backwardleft']='2000,500,1950,1050,350,1600,350,1600
       ,350,1600,350,650,350,650,350,650,350,650,350,650,350,1600,350,16
       00,400'
32.     codes['backwardright']='2000,500,2000,1000,350,650,350,650,
       400,550,400,1600,350,650,350,2100,400,1600,350,1600,350,650,350,1
       600,350'
33.     codes[self.stop_any_string]='2000,550,1900,1050,350,650,350
       ,650,300,700,350,650,300,650,350,1600,350,1650,300,1650,300,1650,
       300,1650,300'

34.    elif robot_name=='inchwm_b':
35.     codes['left']='2000,500,2000,1000,350,1600,350,1600,350,650
       ,350,650,350,1600,350,650,350,650,350,1600,350,1600,350,650,350'
36.     codes['right']='1950,550,1950,1000,350,650,400,600,350,1600
       ,350,650,350,1600,400,1550,400,1600,350,600,400,1600,350,600,400'
37.     codes['forward']='2000,500,2000,1000,350,1600,350,650,350,6
       00,400,600,400,1550,400,600,400,1550,400,1600,350,1600,350,600,40
       0'
38.     codes['forwardleft']='2000,500,2000,1000,350,1600,350,650,4
       00,1550,400,600,350,1650,350,650,350,1600,350,650,350,1600,350,65
       0,350'
39.     codes['forwardright']='1950,550,2000,1000,350,650,350,1600,
       350,1600,400,600,400,1600,350,1600,350,650,350,650,350,1600,350,6
       50,350'
40.     codes['backward']='2000,500,2000,1000,350,650,350,1600,350,
       600,400,600,400,1550,400,1600,350,600,400,1600,350,1600,350,650,3
       50'
41.     codes['backwardleft']='2000,500,2000,1000,350,1600,350,1650
       ,350,1600,350,650,350,1600,350,650,350,650,350,650,350,1600,350,6
       50,350'
42.     codes['backwardright']='2000,500,2000,1000,350,650,350,650,
       350,600,400,1600,350,1600,350,1650,350,1600,400,1550,350,650,350,
       650,350'
43.     codes[self.stop_any_string]='2000,500,2000,1000,350,650,350
       ,650,350,600,400,600,400,1550,400,1600,350,1600,350,1600,350,1600
       ,400,600,350'
```

FIG. 17B

```
44.     elif robot name=='spider a':
45.       codes['left']='4200,1050,1000,1050,1050,1000,2000,1100,1050
    ,1050,1000,1050,2050'
46.       codes['right']='4150,1050,1050,1000,950,1150,950,1100,2050,
    1050,1050,1050,2000'
47.       codes['forward']='4150,1100,1000,1050,2050,1050,1000,1050,1
    050,1000,1000,1100,2050'
48.       codes['forwardleft']='4150,1050,1000,1050,2050,1100,2000,10
    50,950,1150,1000,1050,2050'
49.       codes['forwardright']='4150,1050,1000,1050,2050,1050,1050,1
    050,2050,1050,1000,1050,2050'
50.       codes['backward']=''
51.       codes[self.stop_any_string]='4100,1150,1000,1050,1000,1050,
    1000,1100,1050,1000,1000,1050,2050'

52.     elif robot name=='spider b':
53.       codes['left']='4200,1050,2050,1000,1000,1100,2050,1050,1000
    ,1050,1000,1100,1000'
54.       codes['right']='4200,1000,2050,1050,1000,1050,900,1150,2050
    ,1050,1050,1050,1000'
55.       codes['forward']='4200,1050,2050,1050,2000,1100,1000,1050,1
    050,1000,950,1150,1000'
56.       codes['forwardleft']='4150,1050,2050,1050,2050,1050,2000,11
    00,1000,1100,1000,1050,900'
57.       codes['forwardright']='4150,1050,2050,1050,2050,1050,1000,1
    050,2050,1050,1050,1000,950'
58.       codes['backward']=''
59.       codes[self.stop_any_string]='4150,1050,2050,1050,1050,1000,
    1000,1100,1000,1050,1000,1050,1050'

60.     elif robot name=='bc samsung tv':
61.       codes['forward']='4450,4600,500,1700,500,1750,500,1750,500,
    600,500,650,500,600,500,650,500,600,500,1750,500,1750,500,1750,50
    0,600,500,600,500,650,500,600,500,650,500,600,500,1750,500,600,50
    0,650,500,1750,500,600,500,600,500,650,500,1750,500,600,500,1750,
    500,1750,500,600,500,1750,500,1750,500,1750,450'
62.       codes['backward']='4450,4550,500,1750,500,1750,500,1700,500
    ,650,500,600,500,650,500,600,500,600,500,1750,500,1750,500,1750,5
    00,600,500,650,500,600,500,650,500,600,500,600,500,650,500,600,50
    0,650,500,1700,500,650,500,600,500,650,500,1700,500,1750,500,1750
    ,500,1750,500,600,500,1750,500,1750,500,1750,500'
63.       codes['left']='4450,4550,500,1750,500,1750,500,1750,500,600
    ,500,650,450,650,500,600,500,650,500,1750,450,1750,500,1750,500,6
    50,450,650,500,600,500,650,500,600,500,1750,500,1750,500,1750,500
    ,600,500,650,450,650,500,600,500,650,500,600,500,650,450,650,500,
    1750,500,1750,500,1700,500,1750,500,1750,500'
64.       codes['right']='4450,4600,450,1750,500,1750,500,1750,500,60
    0,500,650,500,600,500,650,500,600,500,1750,500,1750,450,1800,450,
    650,500,600,500,650,500,600,500,650,500,1700,500,1750,500,650,500
    ,1700,500,650,500,600,500,650,500,600,500,650,450,650,500,1750,50
    0,600,500,1750,500,1750,500,1750,500,1700,500'
```

FIG. 17C

```
65.     codes['forward'+self.stop_string]=''
66.     codes['backward'+self.stop_string]=''
67.     codes['right'+self.stop_string]=''
68.     codes['left'+self.stop_string]=''

69.   elif robot_name=='robosapien':
70.     codes['left_hand_up']='7000,3400,850,950,850,900,900,900,85
   0,3400,850,950,850,900,900,3400,800'
71.     codes['left_hand_down']='7050,3400,850,950,850,900,850,950,
   850,3400,850,3400,900,900,850,950,800'
72.     codes['right_hand_up']='7050,3400,850,900,850,950,850,950,8
   50,900,850,950,850,950,850,3400,850'
73.     codes['right_hand_down']='7000,3400,850,950,900,900,850,900
   ,850,950,850,3400,850,950,850,950,850'
74.     #codes['forward']='7000,3450,850,900,850,950,850,950,850,90
   0,850,3400,850,3400,900,900,850'
75.     #codes['left']='7000,3400,850,900,900,900,850,950,850,900,8
   50,950,850,900,900,900,850'
76.     #codes['right']='7050,3400,850,900,850,950,850,950,850,3400
   ,850,900,900,900,850,950,850'
77.     #codes['backward']='7000,3400,850,950,850,900,900,900,850,9
   50,850,3400,850,3400,850,3400,900'
78.     #codes['forward'+self.stop_string]='7050,3400,850,900,850,9
   50,850,950,850,3400,850,3400,850,3400,850,950,850'
79.     #codes['left'+self.stop_string]='7050,3400,850,900,850,950,
   850,950,850,3400,850,3400,850,3400,850,950,850'
80.     #codes['right'+self.stop_string]='7050,3400,850,900,850,950
   ,850,950,850,3400,850,3400,850,3400,850,950,850'
81.     #codes['backward'+self.stop_string]='7050,3400,850,900,850,
   950,850,950,850,3400,850,3400,850,3400,850,950,850'
```

LEARNING APPARATUS AND METHODS FOR CONTROL OF ROBOTIC DEVICES VIA SPOOFING

CROSS-REFERENCE TO RELATED APPLICATIONS

This application is related to co-pending and co-owned U.S. patent application Ser. No. 14/244,892 entitled "SPOOFING REMOTE CONTROL APPARATUS AND METHODS", filed herewith on Apr. 3, 2014, U.S. patent application Ser. No. 14/244,890 entitled "APPARATUS AND METHODS FOR REMOTELY CONTROLLING ROBOTIC DEVICES", filed herewith on Apr. 3, 2014, U.S. patent application Ser. No. 14/208,709 entitled "TRAINABLE MODULAR ROBOTIC APPARATUS AND METHODS", filed Mar. 13, 2014, U.S. patent application Ser. No. 13/918,338 entitled "ROBOTIC TRAINING APPARATUS AND METHODS", filed Jun. 14, 2013, U.S. patent application Ser. No. 13/918,298 entitled "HIERARCHICAL ROBOTIC CONTROLLER APPARATUS AND METHODS", filed Jun. 14, 2013, U.S. patent application Ser. No. 13/907,734 entitled "ADAPTIVE ROBOTIC INTERFACE APPARATUS AND METHODS", filed May 31, 2013, U.S. patent application Ser. No. 13/842,530 entitled "ADAPTIVE PREDICTOR APPARATUS AND METHODS", filed Mar. 15, 2013, U.S. patent application Ser. No. 13/842,562 entitled "ADAPTIVE PREDICTOR APPARATUS AND METHODS FOR ROBOTIC CONTROL", filed Mar. 15, 2013, U.S. patent application Ser. No. 13/842,616 entitled "ROBOTIC APPARATUS AND METHODS FOR DEVELOPING A HIERARCHY OF MOTOR PRIMITIVES", filed Mar. 15, 2013, U.S. patent application Ser. No. 13/842,647 entitled "MULTICHANNEL ROBOTIC CONTROLLER APPARATUS AND METHODS", filed Mar. 15, 2013, and U.S. patent application Ser. No. 13/842,583 entitled "APPARATUS AND METHODS FOR TRAINING OF ROBOTIC DEVICES", filed Mar. 15, 2013, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to adaptive control and training of robotic devices.

Background

Robotic devices may be used in a variety of applications, such as consumer (service) robotics, landscaping, cleaning, manufacturing, medical, safety, military, exploration, and/or other applications. Some existing robotic devices (e.g., manufacturing assembly and/or packaging) may be programmed in order to perform desired functionality. Some robotic devices (e.g., surgical robots and/or agriculture robots) may be remotely controlled by humans, while some robots (e.g., iRobot Roomba®) may learn to operate via exploration. Some remote controllers (e.g., Harmony® universal remote controller) may be configured to cause execution of multiple tasks by one or more robotic devices via, e.g., a macro command. However, operation of robotic devices by such controllers even subsequent to controller training still requires user input (e.g., button press).

Remote control of robotic devices may require user attention during the duration of task execution by the robot. Remote control typically relies on user experience and/or agility that may be inadequate when dynamics of the control system and/or environment (e.g., an unexpected obstacle appears in path of a remotely controlled vehicle) change rapidly.

SUMMARY

One aspect of the disclosure relates to a robotic system. The system may comprise a first robotic device. The system may comprise a remote controller configured to provide a first wireless transmission conveying a first control instruction from a user to the first robotic device. The first control instruction may be configured to cause the first robotic device to execute a first action. The system may comprise a learning controller apparatus configured to, during first time interval: receive the first wireless transmission; determine a first context associated with execution of the first action; and determine an association between data related to the first control instruction and the first context. During a second time interval, subsequent to the first time interval, the learning controller apparatus may be configured to: determine another version of the first context related to execution of the first action; and provide, in lieu of the first control instruction, a first remote transmission conveying data related to the first control instruction, the data related to the first control instruction being configured to cause the first robotic device to execute the first action.

In some implementations, the provision of the first remote transmission may be configured to occur automatically and in absence of the first wireless transmission. The execution of the first action by the first robotic device based on the first remote transmission may be performed in an absence of an additional command instruction from the user.

In some implementations, the data related to the first control instruction may be determined based on the receipt of the first wireless transmission. The first wireless transmission may be configured based on a first carrier wave. The first control instruction may comprise one or more pulses of the first carrier wave. The data related to the first control instruction may comprise the one or more pulses of the carrier.

In some implementations, the system may comprise a visual sensor component configured to provide the first context. The first context may comprise information related to one or both of (i) a motion of the first robotic device during execution of the first action or (ii) a visual scene of an environment around the first robotic device.

In some implementations, the first robotic device may comprise a motion sensor configured to provide information related to one or both of (1) a motion of the first robotic device or (2) a motion of objects in an environment around the first robotic device. The first context may comprise the motion information.

In some implementations, the system may comprise a second robotic device. The learning controller apparatus may be configured to: receive a second wireless transmission provided by the remote controller, the second wireless transmission conveying a second control instruction from the user; determine a second context associated with execution of a second action; determine a second association between the second context and the second control instruction; and based on the second association and occurrence of the second context, provide, in lieu of the second control instruction from the user, a second remote transmission conveying data related to the second control instruction configured to cause the second robotic device to execute the second action.

In some implementations, the second context may comprise a position of the first robotic device relative the second robotic device.

In some implementations, the execution of the first action may be based on a plurality of operations having a plurality of control instructions associated therewith. The plurality of control instructions may comprise the first control instruction. The learning controller may utilize input from the user to effectuate the execution of the first action. The utilization may be configured based on a first portion of the plurality of control instructions provided by the user. A second portion of the plurality of control instructions may be provided by the learning controller instead of the user.

Another aspect of the disclosure relates to a learning apparatus for operating a device. The apparatus may comprise one or more physical processors configured to execute computer program instructions. During a first plurality of training trials, execution of the computer program instruction may cause the one or more physical processors to: determine a control signal directed to the device, the control signal being provided by a user via a remote controller; and store observed context information associated with an environment surrounding the device. During a training trial subsequent to the first plurality of training trials, execution of the computer program instruction may cause the one or more physical processors to: responsive to observation of the context information, transmit the control signal to the device.

In some implementations, the remote controller may comprise a wireless transmitter. The device may comprise a remotely controller apparatus.

In some implementations, the control signal transmission may be configured to cause the remotely controller apparatus to perform a task.

In some implementations, the device may be configured to perform the task responsive to the control signal provision by the user via the remote controller.

In some implementations, the system may comprise a receiver component configured to receive a carrier waveform. The system may comprise a transmitter component configured to emit the carrier waveform. The provision of the control signal by the user may be effectuated responsive to a receipt by the receiver component of the carrier waveform transmitted by the remote controller. The provision or transmission of the control signal to the device by the apparatus may be effectuated based on emission by the transmitter component of the carrier waveform.

In some implementations, the system may comprise an enclosure configured to house one or more of the receiver, the transmitter, and the one or more physical processors. The context information may convey information related to an environment external to the enclosure.

In some implementations, the enclosure may comprise a portion of a portable communications devise selected the group consisting of a smartphone, a notebook computer, and a tablet computer. The apparatus may be disposed within the enclosure.

In some implementations, the device may comprise one or both of a household appliance or a toy. The context information may be related to an environment external to the apparatus.

In some implementations, the device may comprise a robotic device configured to be operated by the user via the remote controller. The robotic device may comprise one or more controllable actuators configured to operate in one or more degree of freedom. The context information may comprise data related to a present configuration of the robotic device. The present configuration may be determined substantially contemporaneously with the receipt of the carrier wave.

In some implementations, the context information may be configured to relate a location of the device within an environment external to the apparatus.

In some implementations, execution of the task may be based on one or more movement actions performed by the device. The context information may convey data related to at least one of the one or more movement actions.

Yet another aspect of the disclosure relates to a remote control apparatus of a robot. The apparatus may comprise electronic storage, and one or more physical processors configured to execute computer program instructions. Execution of the computer program instruction may cause the one or more physical processors to: store, in the electronic storage, information related to a state of the robot; store, in the electronic storage, a first control command, the control command occurring temporally proximate to the state; and based on a determination that a current state of the robot matches the state, causing a provision of a second control command.

In some implementations, the second control command may comprise the first control command.

In some implementations, the first control command may comprise a plurality of control instructions. Individual ones of the plurality of instructions may be configured to cause the robot to execution portions of a task. The second control command may comprise a sequence of control commands. Individual commands of the sequence may be configured to cause the robot to execute the respective portions of the task. The second control command may be configured to cause the task execution in lieu of the first control command.

In some implementations, the apparatus may comprise a wireless receiver configured to receive a wireless transmission associated with the first control command provided by a user via wireless remote controller.

In some implementations, the wireless receiver may be configured to receive a third control command provided by the user via the wireless remote. The third control command may comprise a plurality of control commands. Individual ones of the plurality of control commands may be configured to cause the robot to perform an action.

In some implementations, causing the provision of the second control command may be responsive to receipt of the first control command by the receiver.

In some implementations, the second control command may be configured to modify the state of the robot.

In some implementations, the storing of the information related to the state of the robot may be performed responsive to an output of a video camera.

In some implementations, the video camera may be disposed on the robot. The information related to a state of the robot may convey data related to an environment external to the robot.

In some implementations, causing the provision of the second control command may be responsive to execution of a supervised learning process by the one or more processors. The apparatus may be configured to be attached to the robot.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIG. 12 is a block diagram illustrating a system comprising a learning controller configured to automate operation of home entertainment appliance (e.g., a TV), according to one or more implementations.

FIG. 13 is a block diagram illustrating a learning apparatus configured to enable remote control of a robotic device based on an association between user input and actions of the device, according to one or more implementations.

FIG. 15 is a block diagram illustrating a robotic device comprising a learning controller apparatus of the disclosure, according to one or more implementations.

FIGS. 17A-D are a computer program listing illustrating exemplary control command codes for a plurality of selected remote controlled devices, according to one or more implementations.

Figure 1A:
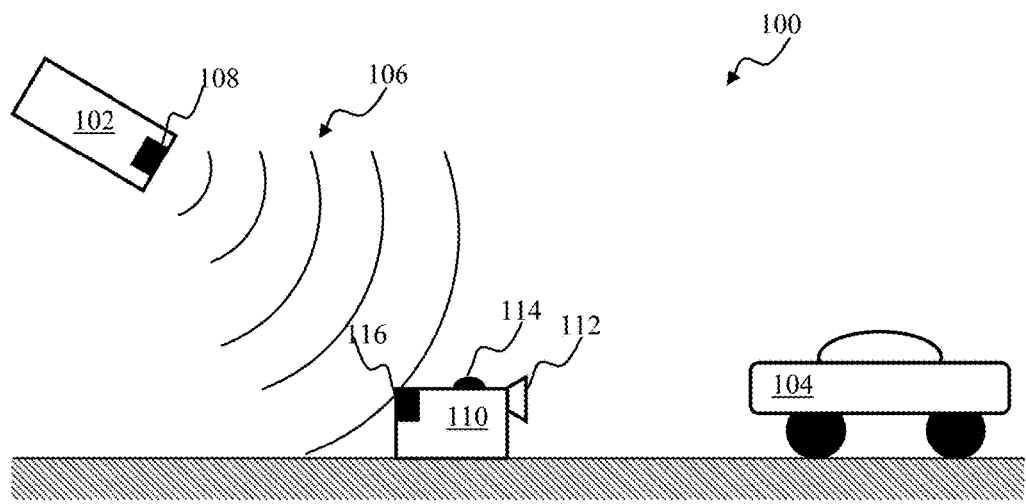
FIG. 1A is a block diagram illustrating reception of user commands by learning remote controller apparatus, according to one or more implementations.

All Figures disclosed herein are ©Copyright 2014 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

FIG. 1A illustrates one implementation of using a learning controller apparatus to learn remote control operation of a robotic device. The system 100 of FIG. 1A may comprise a learning controller apparatus 110, a robotic device (e.g., a rover 104), and a user remote control device 102. The remote control handset device 102 may be utilized by the user to issue one or more remote control instructions (e.g., turn left/right), shown by the curves 106, to the robotic device 104 in order to enable the robot to perform a target task. The task may comprise, e.g., a target approach, avoid obstacle, follow a trajectory (e.g., a race track), follow an object, and/or other task. In one or more implementations, communication 106 between the remote control handset 102 and the robotic device may be effectuated using any applicable methodology, e.g., infrared, radio wave, pressure waves (e.g., ultrasound), and/or a combination thereof.

In some implementations of infrared user remote controller handsets 102, the signal between the handset 102 and the robot 104 may comprise pulses of infrared light, which is invisible to the human eye, but may be detected by electronic means (e.g., a phototransistor). During operation, a transmitter 108 in the remote control handset may sends out a stream of pulses of infrared light when the user presses a button on the handset. The transmitter may comprise a light emitting diode (LED) built into the pointing end of the remote control handset 102. The infrared light pulses associated with a button press may form a pattern unique to that button. For multi-channel (normal multi-function) remote control handsets, the pulse pattern may be based on a modulation of the carrier with signals of different frequency. A command 106 from a remote control handset may comprise a train of pulses of carrier-present and carrier-not-present of varying widths.

The robotic device 104 may comprise a receiver device configured to detect the pulse pattern and cause the device 104 to respond accordingly to the command (e.g., turn right).

During operation of the robotic device 104 by a user, the learning controller apparatus 110 may be disposed within the transmitting aperture of the transmitter 108. In some implementations of infrared user remote controller 102, the learning controller apparatus 110 may comprise an infrared sensor 116 configured to detect the pulses of infrared light within the communications 106. It will be appreciated by those skilled in the arts that other transmission carriers (e.g., pressure waves, radio waves, visible light) may be utilized with the principles of the present disclosure. The learning controller apparatus 110 may comprise a detector module configured consistent with the transmission carrier used The learning controller apparatus 110 may comprise a user interface element 114 (e.g., a button, a touch pad, a switch, and/or other user interface element) configured to enable the user to activate learning by the apparatus 110. In some implementations, the interface 114 may comprise a sensor (e.g., a light wave sensor, a sound wave sensor, a radio wave sensor, and/or other sensor). The activation command may comprise a remote action by a user (e.g., a clap, a click, a whistle, a light beam, a swipe of a radio frequency identification device (RFID) tag, and/or other action). Subsequent to activation of learning, the learning controller apparatus 110 may detect one or more command instructions within the transmissions 106. In some implementations, the command instruction detection may be performed using a pre-configured library of commands (e.g., a table comprising a waveform characteristics and a corresponding command instruction). The table may be determined using a command learning mode wherein a user may operate individual buttons of the remote control handset device (e.g., 102) and employ a user interface device (e.g., 210 described below with respect to FIG. 2A below) to assign respective control command to a given button of the remote control handset.

In one or more implementations, the command instruction detection may be performed using an auto-detection process. By way of an illustration of one implementation of the command auto detection process, a new portion of a received transmission 106 may be compared to one or more stored portions. In some implementations, the comparison may be based on a matched filter approach wherein the received portion may be convolved (cross-correlated) with one or more individual ones of previously detected waveforms. Based on detecting a match (using, e.g. a detection threshold for the convolution output) the new received portion may interpreted as the respective previously observed command. When no match is detected, (e.g., due to the maximum correlation value being below a threshold) the new received portion may be interpreted as new command. The newly detected command (e.g., the new received waveform portion) may be placed into a command table. Action associated with the newly detected command may be determined using sensory input associated with the task being performed by the robotic device responsive to occurrence of the command.

The learning controller apparatus 110 may comprise a sensor component 112 configured to provide sensory input to the learning controller. In some implementations, the sensor component 112 may comprise a camera, a microphone, a radio wave sensor, an ultrasonic sensor, and/or other sensor capable of providing information related to task execution by the robotic device 104. In some implementations (not shown) the sensor component 112 may be embodied within the device 104 and the data in such configurations may be communicated to the controller apparatus 110 via a remote link.

In one or more implementations, such as object recognition, and/or obstacle avoidance, the sensory input provided by the sensor component 112 may comprise a stream of pixel values associated with one or more digital images. In one or more implementations of e.g., video, radar, sonography, x-ray, magnetic resonance imaging, and/or other types of sensing, the input may comprise electromagnetic waves (e.g., visible light, infrared (IR), ultraviolet (UV), and/or other types of electromagnetic waves) entering an imaging sensor array. In some implementations, the imaging sensor array may comprise one or more of artificial retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of red green, blue (RGB) values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure. Pixels and/or groups of pixels associated with objects and/or features in the input frames may be encoded using, for example, latency encoding described in co-owned U.S. patent application Ser. No. 12/869,583, filed Aug. 26, 2010, issued as U.S. Pat. No. 8,467,623 on Jun. 18, 2013, and entitled "INVARIANT PULSE LATENCY CODING SYSTEMS AND METHODS", co-owned U.S. patent application Ser. No. 12/869,573, filed Aug. 26, 2010, issued as U.S. Pat. No. 8,315,305 on Nov. 20, 2012, entitled "SYSTEMS AND METHODS FOR INVARIANT PULSE LATENCY CODING"; co-owned U.S. patent application Ser. No. 13/152,084, filed Jun. 2, 2011, issued as U.S. Pat. No. 9,405,975 on Aug. 2, 2016, and entitled "APPARATUS AND METHODS FOR PULSE-CODE INVARIANT OBJECT RECOGNITION"; and/or latency encoding comprising a temporal winner take all mechanism described in co-owned U.S. patent application Ser. No. 13/757,607, filed Feb. 1, 2013, issued as U.S. Pat. No. 9,070,039 on Jun. 30, 2015, and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using spiking neuron classifier comprising conditionally independent subsets as described in co-owned U.S. patent application Ser. No. 13/756,372 filed Jan. 31, 2013, issued as U.S. Pat. No. 9,195,934 on Nov. 24, 2015, and entitled "SPIKING NEURON CLASSIFIER APPARATUS AND METHODS USING CONDITIONALLY INDEPENDENT SUBSETS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such neuron excitability described in U.S. patent application Ser. No. 13/623,820 entitled "APPARATUS AND METHODS FOR ENCODING OF SENSORY DATA USING ARTIFICIAL SPIKING NEURONS", filed Sep. 20, 2012, and issued as U.S. Pat. No. 9,047,568 on Jun. 2, 2015, the foregoing being incorporated herein by reference in its entirety.

In some implementations, analog inputs may be converted into spikes using, for example, kernel expansion techniques described in co-owned U.S. patent application Ser. No. 13/623,842 filed Sep. 20, 2012, issued as U.S. Pat. No. 9,367,798 on Jun. 14, 2016, and entitled "SPIKING NEURON NETWORK ADAPTIVE CONTROL APPARATUS AND METHODS", the foregoing being incorporated herein by reference in its entirety. In one or more implementations, analog and/or spiking inputs may be processed by mixed signal spiking neurons, such as co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, and issued as U.S. Pat. No. 9,213,937 on Dec. 15, 2015, each of the foregoing being incorporated herein by reference in its entirety.

The learning controller 110 may comprise an adaptable predictor block configured to, inter alia, determine an association between the remote control instructions 106 and context determined from the sensory input. In some implementations, the context may comprise presence, size, and/or location of targets and/or obstacles, rover 104 speed and/or position relative an obstacle, and/or other information associated with environment of the rover. The control instruction may comprise a turn right command. Various methodologies may be utilized in order to determine the associations between the context and user instructions, including, e.g., these described in co-owned U.S. patent application Ser. No. 13/953,595 entitled "APPARATUS AND METHODS FOR CONTROLLING OF ROBOTIC DEVICES", filed Jul. 29, 2013; co-owned U.S. patent application Ser. No. 13/918,338 entitled "ROBOTIC TRAINING APPARATUS AND METHODS", filed Jun. 14, 2013, and issued as U.S. Pat. No. 9,384,443 on Jul. 5, 2016; co-owned U.S. patent application Ser. No. 13/918,298 entitled "HIERARCHICAL ROBOTIC CONTROLLER APPARATUS AND METHODS", filed Jun. 14, 2013; co-owned U.S. patent application Ser. No. 13/918,620 entitled "PREDICTIVE ROBOTIC CONTROLLER APPARATUS AND METHODS", filed Jun. 14, 2013, and issued as U.S. Pat. No. 9,314,924 on Apr. 19, 2016; co-owned U.S. patent application Ser. No. 13/907,734 entitled "ADAPTIVE ROBOTIC INTERFACE APPARATUS AND METHODS", filed May 31 2013, and issued as U.S. Pat. No. 9,242,372 on Jan. 26, 2016; co-owned U.S. patent application Ser. No. 13/842,530 entitled "ADAPTIVE PREDICTOR APPARATUS AND METHODS", filed Mar. 15, 2013; co-owned U.S. patent application Ser. No. 13/842,562 entitled "ADAPTIVE PREDICTOR APPARATUS AND METHODS FOR ROBOTIC CONTROL", filed Mar. 15, 2013; co-owned U.S. patent application Ser. No. 13/842,616 entitled "ROBOTIC APPARATUS AND METHODS FOR DEVELOPING A HIERARCHY OF MOTOR PRIMITIVES", filed Mar. 15, 2013; co-owned U.S. patent application Ser. No. 13/842,647 entitled "MULTICHANNEL ROBOTIC CONTROLLER APPARATUS AND METHODS", filed Mar. 15, 2013; and co-owned U.S. patent application Ser. No. 13/842,583 entitled "APPARATUS AND METHODS FOR TRAINING OF ROBOTIC DEVICES", filed Mar. 15, 2013; each of the foregoing being incorporated herein by reference in its entirety. One implementation of adaptive predictor is shown and described below with respect to FIG. 4.

Developed associations between the sensory context and the user control commands may be stored for further use. In some implementations, e.g., such as illustrated with respect to FIG. 1B, the association information may be stored within a nonvolatile storage medium of the learning controller apparatus. In one or more implementations, e.g., such as illustrated with respect to FIG. 10, the association information may be on a nonvolatile storage medium disposed outside of the learning controller apparatus (e.g., within a computing Cloud, and/or other storage device).

Figure 1B:
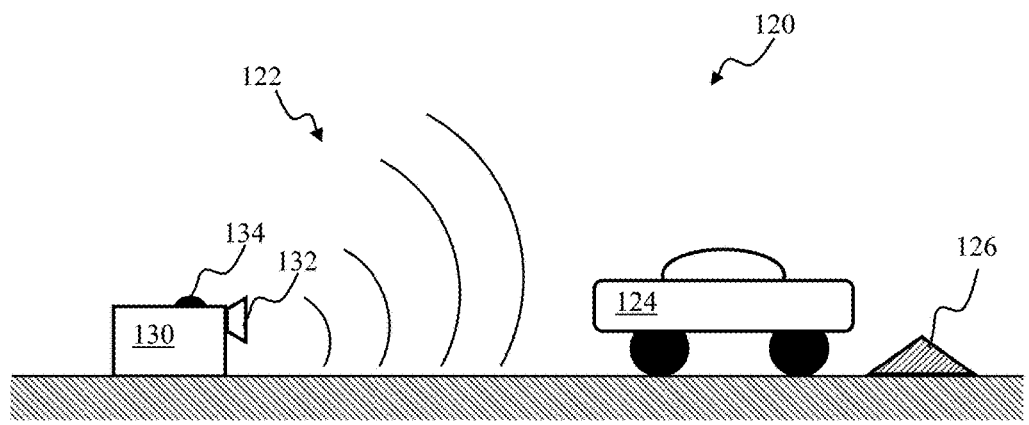
FIG. 1B is a block diagram illustrating provision control instructions to a robot by the learning remote controller apparatus, according to one or more implementations.

Upon developing the associations between the sensory context and user remote control commands, the learning controller (e.g., 110 in FIG. 1A) may be capable of providing one or more control instructions to robotic device in lieu of user remote control commands. FIG. 1B illustrates provision of control instructions to a robot by the learning remote controller apparatus, according to one or more implementations. The system 120 of FIG. 1B may comprise a learning controller 130 configured to provide control instructions to a robotic device (e.g., a remote control car 124). Provision of the control instructions may be effectuated over wireless interface transmissions depicted by curves 122. The controller 130 may comprise a user interface component 134 configured to start, pause, and/or stop learning of associations. In some implementations, the interface 134 may be configured to cause the apparatus not to effectuate the transmissions 122. Such functionality may be utilized when, e.g., the controller 130 may learn an association that may not deem desired/appropriate by the user (e.g., causing the device 126 to continue approaching the obstacle 126). The user may actuate the interface 134 to instruct the controller 134 not to transmit commands 122 for the present context. In some implementations, the interface 134 may be configured to instruct the controller 130 to "learn to not send the specific commands you are currently sending in this context". In some implementations, the detection of the communications 106 and/or, one more command instructions within the transmissions 106 may be referred to as spoofing and provision of the one or more control instructions to robotic device in lieu of user remote control commands (e.g., via transmissions 122 illustrated in FIG. 1B) may be referred to as spoofing. A learning remote controller configured to enable the provision of the one or more control instructions to robotic device in lieu of user remote control commands may be referred to as a "spoofing remote controller".

The learning controller 130 may comprise a sensory module 132 configured to provide sensory context information to the controller. In some implementations, the sensory module may comprise a visual, audio, radio frequency and/or other sensor, e.g., such as described above with respect to FIG. 1A. The control instructions may be produced based on a determination of one or more previously occurring sensory context within the sensory input. By way of an illustration, the learning controller 130 may observe the car 124 approaching an obstacle 126. During learning, a user may issue a "go back" control command to the car 124, e.g., as described above with respect to FIG. 1A. During operation subsequent to learning, the learning controller 130 may automatically determine the "go back" control command based on (i) determining sensory context A (comprising the robotic car 124 approaching an obstacle); and (ii) existing association between the context A and the "go back" control command. The controller 130 may automatically provide the "go back" control command to the robotic car via the remote link 122. Such functionality may obviate need for users of robotic devices to perform step-by-step control of robotic devices (e.g., the device 124)), generate commands faster, generate more precise commands, generate commands fully autonomously, or generate multiple commands for simultaneous control of multiple degrees of freedom of a robot or multiple robots thereby enabling users to perform other tasks, operate robots more complex tasks that may be attainable via a remote control by a given user (e.g., due to lack of user adroitness, and/or experience) and/or other advantages that may be discernable given the present disclosure.

Figure 1C:
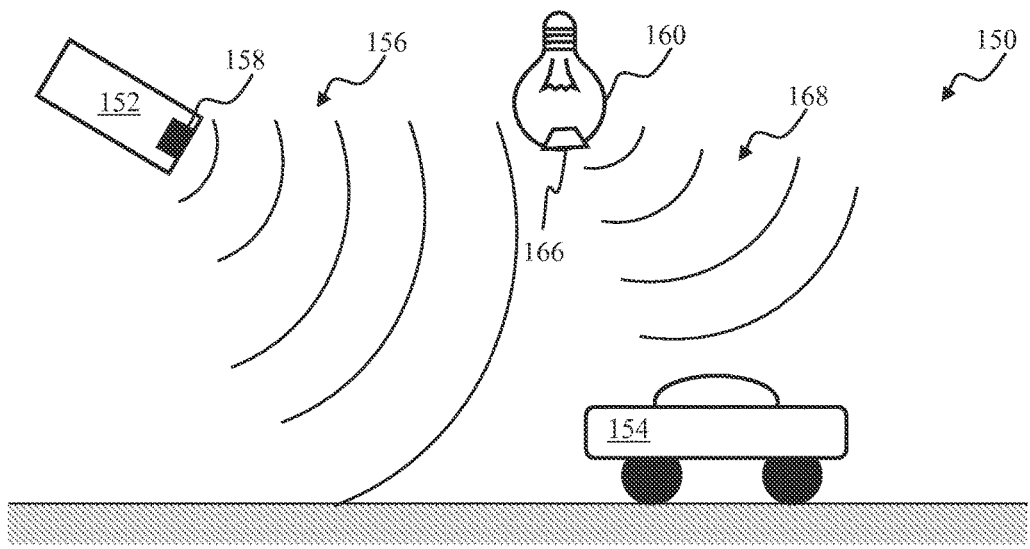
FIG. 1C is a block diagram illustrating a learning remote controller apparatus configured to be incorporated into an existing infrastructure of user premises, according to one or more implementations.

In one or more implementations, the learning controller may be incorporated into existing user premises infrastructure. FIG. 1C illustrates one such implementation wherein the learning controller apparatus may be embodied within a household fixture component, e.g., a light-bulb 160. In some implementations, the learning controller apparatus may be embodied in an enclosure with a form factor resembling a light bulb and/or interchangeable with a light bulb. The learning controller may be incorporated into existing user premises infrastructure. In some implementations, the component 160 may comprise any household fixture with a power source, e.g., an doorbell, an alarm (e.g., smoke alarm), a lamp (e.g., portable lamp, torcher), DC and/or AC light fixture (halogen, day light fluorescent, LED, and/or other. In some implementations, the component 160 may be adapted to comprise the camera 166, communications circuitry and a light source (e.g., LED). The component 160 may in some implementations, be adapted to fit into existing mount, e.g., a medium sized Edison 27 (E27). It will be appreciated by those skilled in the arts that a variety of sockets may be employed such as, e.g., Miniature E10, E11, Candelabra E12, European E14, Intermediate E17, Medium E26/E27, 3-Lite (modified medium or mogul socket with additional ring contact for 3-way lamps), Mogul E40, Skirted (PAR-38), Bayonet styles (Miniature bayonet, Bayonet candelabra, Bayonet Candelabra with pre-focusing collar, Medium pre-focus, Mogul pre-focus, Bi-post, and/or other (e.g., fluorescent T-5 mini, T-8, T12)).

The system 150 of FIG. 1C may comprise the learning controller apparatus 110, a robotic device (e.g., a rover 154), and a user remote control device 152. The remote control handset device 152 may be utilized by the user to issue one or more remote control instructions (e.g., turn left/right), shown by the curves 156, to the robotic device 154 in order to enable the robot to perform a target task. During operation of the robotic device 154 by a user, the learning controller apparatus 160 may be disposed within an overhead light bulb socket within transmitting aperture of the handset 152 transmitter 158. In some implementations of infrared user remote controller 152, the learning controller apparatus 150 may comprise an infrared sensor (not shown) configured to detect the pulses of infrared light of communications 156. It will be appreciated by those skilled in the arts that other transmission carriers (e.g., pressure waves, radio waves, visible light) may be utilized with the principles of the present disclosure. The learning controller apparatus 150 may comprise a detector module configured consistent with the transmission carrier used. The learning controller apparatus 160 may comprise a sensor module 166 configured to provide sensory input to the learning controller. In some implementations, the module 166 may comprise a camera, a radio wave sensor, an ultrasonic sensor, and/or other sensor capable of providing information related to task execution by the robotic device 154.

The learning controller apparatus 160 may comprise a user interface module (not shown), e.g. a button, a proximity detection device (e.g., a near-field communications reader), a light sensor, a sound sensor, and/or a switch, configured to enable the user to activate learning by the apparatus 160. The activation command may comprise a remote action by a user (e.g., a clap, a click, a whistle, a light beam, a swipe of an RFID tag, a voice command and/or other action). Subsequent to activation of learning, the learning controller apparatus 160 may detect one or more command instructions within the transmissions 156.

The learning controller 160 may comprise an adaptable predictor block configured to determine an association between the remote control instructions 156 and context determined from the input provided by the sensor module 166. In some implementations, the context may comprise presence, size, and/or location of targets and/or obstacles, the robotic device 154 speed and/or position relative an obstacle, and/or other parameters. The context may be configured exclusive of the transmissions 156. The control instruction may comprise a turn right command. Various methodologies may be utilized in order to determine the associations between the context and user instructions.

Upon developing the associations between the sensory context and user remote control commands, the learning controller (e.g., 160 in FIG. 1C) may be capable of providing one or more control instructions 168 to the robotic device 154 in lieu of user remote control commands 156. In some implementations, wherein protocol specification of the control communication 156 between the handset 152 and the robotic device 154 may be available to the learning controller 160, individual command transmissions within the communication 168 may be configured using the protocol specification (e.g., command pulse code shown and described with respect to FIGS. 17A-D). In some implementations, wherein protocol specification of the control communication 156 between the handset 152 and the robotic device 154 may be unavailable to the learning controller 160, individual command transmissions within the communication 168 may be configured using a playback of transmission 156 portions associated with a given context and/or action by the robotic device (e.g., right turn).

Figure 2A:
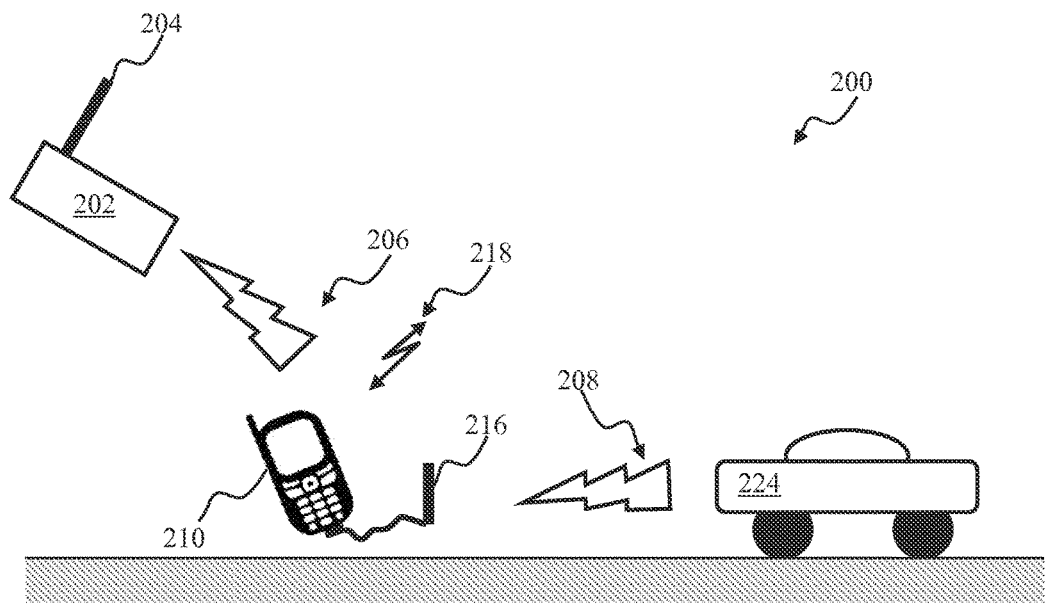
FIG. 2A is a block diagram illustrating a system comprising a learning remote controller apparatus in data communication with a robotic device and user remote control handset, according to one or more implementations.

FIG. 2A illustrates a system comprising a learning remote controller apparatus in data communication with a robotic device and user remote control handset, according to one or more implementations. The system 200 may comprise a robotic device 224, and a user remote control handset 202 (comprising an antenna 204) configured to provide control commands to the robotic device 224. The system 200 may comprise a learning controller apparatus 210. In the implementation of FIG. 2A, the user remote control handset 202 may utilize a bound link configuration (e.g. a radio link session) between the handset and the device 224. Some link examples may include a Bluetooth session, a Digital Spectrum Modulation (DSM) session, and/or other links. The link may be established based on identity of the robotic device 224 and/or the handset 202. By way of an illustration, the radio DSM receiver of the robotic device may scan and recognize an ID code of the DSM transmitter of the handset 202. When a valid code is transmitter located, the handset 202 may be bound to the robotic device 224 via a communication session.

Various implementations of the data communication between the handset 202 and the robot 224 may be employed. In some implementations, a Direct Sequence Spread Spectrum (DSSS), and/or frequency hopping spread spectrum" (FHSS) technology may be utilized. DSSS communication technology may employ carrier phase-modulation using a string of pseudorandom (PR) code symbols called "chips", each of which may have duration that is shorter than an information bit. That is, each information bit is modulated by a sequence of much faster chips. Therefore, the chip rate is much higher than the information signal bit rate. DSSS uses a signal structure in which the sequence of chips produced by the transmitter is already known by the receiver. The receiver may apply the known PR sequence to counteract the effect of the PR sequence on the received signal in order to reconstruct the information signal.

Frequency-hopping spread spectrum (FHSS) is a method of transmitting radio signals by rapidly switching a carrier among many frequency channels, using a pseudorandom sequence known to both transmitter and receiver The learning controller 210 may be employed to operate the robotic device 224. The robotic device operation may comprise engaging in a game (e.g., pursuit, fetch), a competition (e.g., a race), surveillance, cleaning, and/or other tasks. In some implementations, the controller 210 may comprise a specialized computing device (e.g., a bStem®), and/or a computer executable instructions embodied in a general purpose computing apparatus (e.g., a smartphone, a tablet, and/or other computing apparatus). As shown in the implementation of FIG. 2A, the learning controller 210 may comprise a smartphone outfitted with a communications dongle 216. The dongle 216 may comprise a sensor element configured to receive command transmission from user handset 202 and/or provide control command transmissions to the robotic device 224. In one or more implementations, the dongle 216 sensor element may comprise an infrared sensor, a radio frequency antenna, an ultrasonic transducer, and/or other sensor.

The learning controller apparatus 210 may comprise a sensor module (e.g., a built in camera of a smartphone) configured to provide sensory input to the learning controller. The learning controller apparatus 210 may comprise a user interface module (e.g., a touch screen, a button, a proximity detection device (e.g., a near-field communications reader, and/or other proximity detection device), and/or other user interfaces) configured to enable the user to activate learning by the apparatus 210. The activation command may comprise a remote action by a user (e.g., a clap, a click, a whistle, a light beam, a swipe of an RFID tag, and/or other actions).

In order to learn associations between user commands and context associated with the task, the learning controller 210 may establish (i) a data link 206 between the handset 202 and the learning controller 210; and (ii) a data link 208 between the controller 210 and the robotic device 224. Pairing of the handset 202 and the learning controller 210 may enable transmission of the user commands from the handset 202 to the learning controller 210. Pairing of the learning controller 210 and the robotic device 224 may enable transmission of the user commands from the handset 202 to the learning controller 210. In some implementations, a manufacturer of the handset 202 and/or the robot 224 may elect to facilitate the establishment of the links 206, 208 by, e.g., providing link protocol parameters specifications (e.g., the spreading code, list of device IDs) to the controller.

Subsequent to activation of learning, the learning controller apparatus 210 may detect one or more command instructions within the transmissions 206. The learning controller 210 may operate an adaptable predictor block configured to determine an association between the user control instructions 206 and context determined from the sensory input provided by the sensor of the apparatus 210. In some implementations, the context may comprise information related to presence, size, and/or location of targets and/or obstacles, the robotic device 224 speed and/or position relative an obstacle, and/or other parameters. The control instruction may comprise a turn right command. The context information may come from sensors in 210 and from sensors distributed remotely in the environment (not shown). Various methodologies may be utilized in order to determine the associations between the context and user control instructions, including, for example, adaptive predictor methodologies including these described above with respect to FIG. 1A and/or FIG. 4, below.

In some implementations, wherein the learning controller operation is effectuated by a portable communications device (e.g., a smartphone) determination of the associations between the context and user control instructions may be effectuated by the portable device using sensory data obtained by a camera component of the portable device.

In some implementations, determination of the associations between the context and user control instructions may be effectuated by a computing entity (e.g., a local computer and/or a remote Computer cloud) in data communication with the learning controller 210 via link 218. The link 218 may comprise one or more of wired link (e.g., serial, Ethernet) and/or wireless link (e.g., Bluetooth, WiFi, 3G-4G cellular). The sensory context information may be compressed before transmission to the remote computer cloud, and/or may comprise single image frames or a continuous video stream. As a form of compression, the transmission may include differences from periodically transmitted key frames of data, in some implementations. The learning controller 210 may provide sensory context via the link 218 to the computing entity, and/or receive association information from the computing entity.

Based on developing the associations between the sensory context and user remote control commands, the learning controller 210 may be capable of providing one or more control instructions over the link 208 to the robotic device 224 in lieu of user remote control commands 206. In some implementations, wherein protocol specification of the control communication between the handset 202 and the robotic device 224 may be available to the learning controller 210, individual command transmissions within the communication over the link 208 may be configured using the protocol specification (e.g., command pulse code). In some implementations, wherein protocol specification of the control communication between the handset 202 and the robotic device 224 may be unavailable to the learning controller 210, individual command transmissions within the communication over the link 208 may be configured using a playback of transmission portions determined from communications over the link 206 and associated with a given context and/or action by the robotic device (e.g., right turn).

Figure 2B:
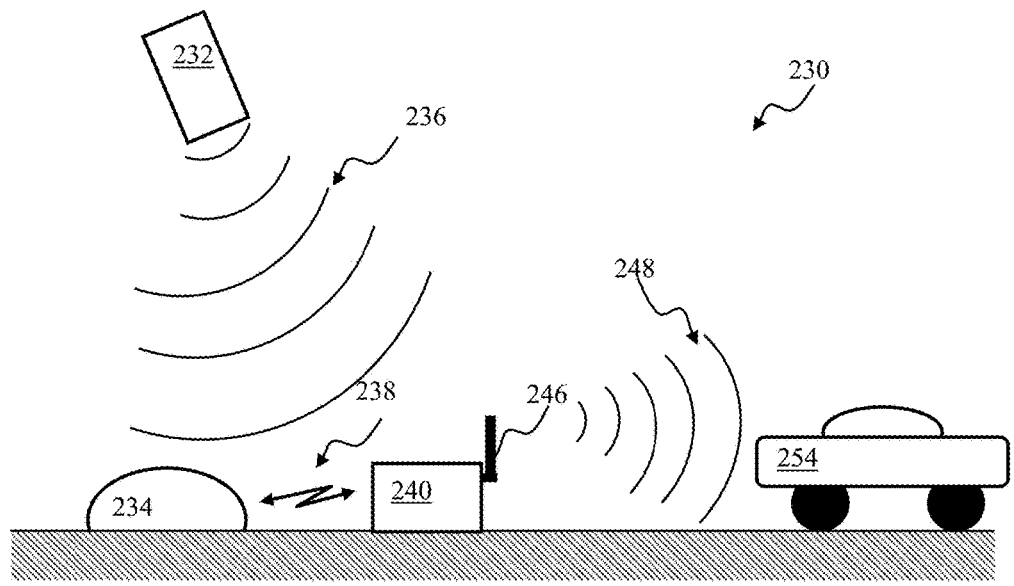
FIG. 2B is a block diagram illustrating a system comprising a learning remote controller apparatus in data communication with a sensor component, according to one or more implementations.

FIG. 2B illustrates a system comprising a learning apparatus in data communication with a sensor apparatus, according to one or more implementations. The system 230 may comprise a robotic device 254, and a component 232 configured to provide control command transmissions 236 for the robotic device. In some implementations, the component 232 may comprise a remote control handset configured to enable a user to provide remote control commands to the robotic device. The system 230 may comprise a sensor apparatus 240 comprising a receiver component 246. In one or more implementations, the receiver component 246 may comprise an infrared receiver (e.g., the dongle 216), a radio frequency antenna, and/or other component (e.g., ultrasonic transducer). The apparatus 240 may comprise a sensor module (e.g., a camera) configured to obtain sensory information related to actions of the robotic device 254, e.g., its position, velocity, and/or configuration of limbs and servos. In some implementations, the apparatus 240 may comprise a portable communications device (e.g., a smartphone) comprising a camera and an infrared module, and the sensory information may comprise a stream of digital video frames.

In some implementations (not shown) the robotic device 254 may comprise a sensor component and be configured to provide sensor data (raw and/or pre-processed) to the logic 234 via a remote link.

The apparatus 240 may communicate information comprising the control commands determined from the transmissions 236 to a computerized learning logic 234 via link 238. In some implementations, wherein the apparatus 240 may comprise a sensor component (e.g., a camera) the link 238 may be utilized to provide sensory information to the logic 234. In some implementations, the sensory information may comprise processed video using, e.g., feature detection, encoding, sub-sampling, and/or other compression techniques configured to reduce amount of data being communicated via the link 238 from the apparatus 240.

In one or more implementations, the logic 234 may be embodied in a personal communications device (e.g., a smartphone), a computer (e.g., tablet/laptop/desktop), a server, a cloud computing service, a specialized hardware (e.g., DSP, GPU, FPGA, ASIC, neuromorphic processing unit (NPU)), and/or other devices or locations. The link 238 may be effectuated using any applicable data transmission implementations, e.g., Wi-Fi, Bluetooth, optical, and/or other communications means.

The logic 234 may implement a learning process configured to determine an association between one or more control commands and context determined from the sensory data communicated via the link 238. In some implementations, the context may comprise presence, size, and/or location of targets and/or obstacles, robotic device speed and/or position relative to an obstacle, history of control commands, configuration of limbs and attachments to the robotic device, position of external objects in the environment, and/or other information. An apparatus embodying the logic 234 may comprise a user interface module (e.g., a touch screen, a button, a proximity detection device (e.g., a near-field communications reader, and/or other proximity detection device), and/or other user interface) configured to enable the user to activate learning by the logic 234. The activation command may comprise a remote action by a user (e.g., a clap, a click, a whistle, a light beam, a voice command, a swipe of an RFID tag, and/or other action). Subsequent to activation of learning, the logic 234 may detect one or more remote control instructions within data stream communicated via the transmissions 238. The logic 234 may comprise an adaptable predictor (e.g., described with respect to FIG. 4, 11A-11B, 14) configured to determine an association between the remote control instructions and context determined from the sensory input provided by the sensor component. In some implementations, the context may comprise information related to presence, size, and/or location of targets and/or obstacles, the robotic device 224 speed and/or position relative an obstacle, and/or other parameters. The control instruction may comprise a turn right command.

Based on developing the associations between the sensory context and the remote control instructions, upon occurrence of a given context (e.g., vehicle approaching a wall), the learning logic 234 may be capable of providing one or more control instructions (that may be associated with such context, e.g., turn right) over the link 238 to the sensor apparatus 240. The apparatus 240 may relay such automatically generated instructions (shown by waveforms 248) to the robotic device 254 in lieu of remote control commands 236. In some implementations, wherein protocol specification of the control communication between the controller 232 and the robotic device 254 may be available to the apparatus 240 and/or logic 234, individual command transmissions within the communication over the link 248 may be configured using the protocol specification (e.g., command pulse code). In some implementations, wherein protocol specification of the control communication between the controller 232 and the robotic device 224 may be unavailable to the apparatus 240 and/or logic 234, individual command transmissions within the communication over the link 238 may be configured using a playback of transmission portions determined from communications over the link 236 and associated with a given context and/or action by the robotic device (e.g., right turn).

Figure 3:
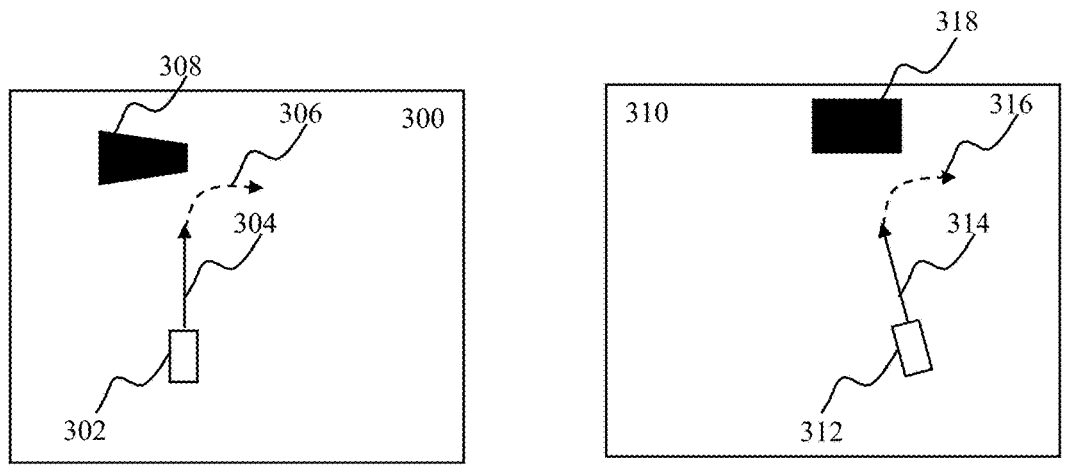
FIG. 3 is a graphical illustration of context used with operation of a robotic device operation by a learning controller apparatus of, e.g., FIG. 1A, according to one or more implementations.

FIG. 3 illustrates context useful for operation of a robotic device using a learning controller apparatus of, e.g., FIG. 1A, according to one or more implementations.

Figure 2C:
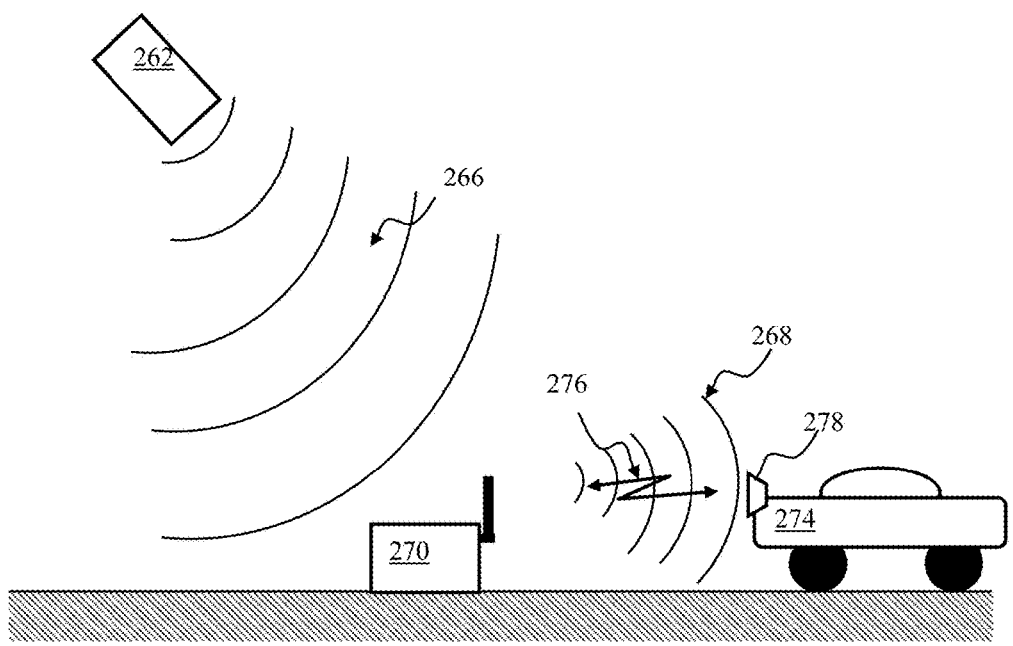
FIG. 2C is a block diagram illustrating a system comprising a learning remote controller apparatus in data communication with a sensor component and a robotic device, according to one or more implementations.

Panel 300 in FIG. 3 illustrates a trajectory of a robotic device 302 approaching an obstacle, shown by solid shape 308, during training of a learning controller (e.g., the learning controller 210 of FIG. 2A). In some implementations, the device 302 may comprise a robotic device 104, 124, 154, 224 of FIGS. 1A-2, respectively, controlled by a user via a remote handset. Responsive to a user control command 'turn right', the device 302 may execute a right turn, shown by broken curve arrow 306. The context configuration of the panel 300 may comprise location and/or orientation of the robotic device 302 relative the obstacle 306, approach portion 304 of the robot trajectory; and/or the user 'turn right' control command itself causing the trajectory turn 306.

Panel 310 in FIG. 3 illustrates use of previously developed association by, e.g., the learning controller 210 of FIG. 2A, to navigate the robot 312 away from an obstacle 318 during operation. Upon determining a context configuration characterized by the presence of an obstacle (e.g., 318) in path 314 of the robot 312, the learning controller may "recall" the control command "turn right" that may have been associated with similar context during learning (e.g., during operation corresponding to the panel 300). Based on the control command provided by the learning controller in lieu of the user command, the robot 312 may execute right turn, shown by the arrow 316.

Figure 4:
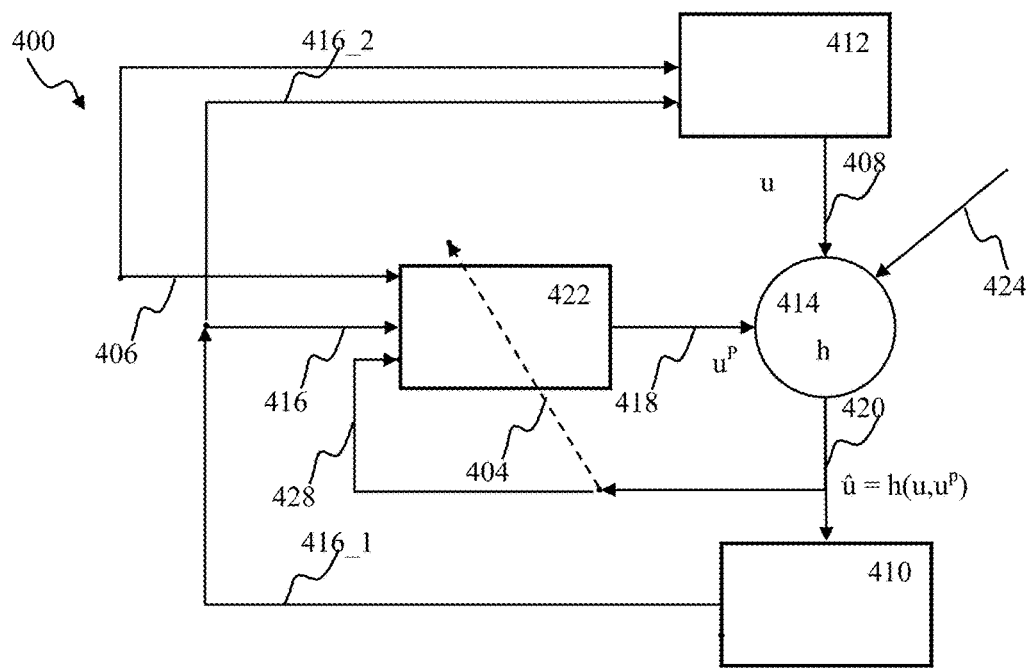
FIG. 4 is a block diagram illustrating an adaptive predictor for use with, e.g., a learning controller apparatus of, e.g., FIG. 1A, according to one or more implementations.

Various methodologies may be utilized in order to develop associations between sensory context and robot actions (caused by user remote control commands). FIG. 4 illustrates an adaptive control system configured to develop an association between a control action and sensory context for use with, e.g., a learning controller apparatus of, e.g., FIGS. 1A-2, according to one or more implementations. The adaptive control system 400 of FIG. 4 may comprise a control entity 412, an adaptive predictor 422, and a combiner 414 cooperating to control a robotic platform 410. The learning process of the adaptive predictor 422 may comprise a supervised learning process (e.g. error back propagation), an unsupervised learning process (e.g., restricted Boltzmann machine), a reinforcement learning process (e.g., Q-learning), and/or a combination thereof. The control entity 412, the predictor 422 and the combiner 414 may cooperate to produce a control signal 420 for the robotic platform 410. In one or more implementations, the control signal 420 may comprise one or more motor commands (e.g., pan camera to the right, turn right wheel forward), sensor acquisition parameters (e.g., use high resolution camera mode), and/or other parameters.

The control entity 412 may be configured to generate control signal (u) 408 based on one or more of (i) sensory input (denoted 406 in FIG. 4) and plant feedback 416_2. In some implementations, plant feedback may comprise proprioceptive signals, such as the readings from servo motors, joint position, and/or torque. In some implementations, the sensory input 406 may correspond to the sensory input, described, e.g., with respect to FIG. 1A, supra. In one or more implementations, the control entity may comprise a human trainer, communicating with the robot via a remote controller. In one or more implementations, the control entity may comprise a computerized agent such as a multifunction adaptive controller operable using reinforcement and/or unsupervised learning and capable of training other robotic devices for one and/or multiple tasks.

The adaptive predictor 422 may be configured to generate predicted control signal $u^P$ 418 based on one or more of (i) the sensory input 406 and the plant feedback 416_1. The predictor 422 may be configured to adapt its internal parameters, e.g., according to a supervised learning rule, and/or other machine learning rules.

Predictor realizations, comprising plant feedback, may be employed in applications such as, for example, wherein (i) the control action may comprise a sequence of purposefully timed commands (e.g., associated with approaching a stationary target (e.g., a cup) by a robotic manipulator arm); and (ii) the plant may be characterized by a plant state time parameter (e.g., arm inertia, and/or motor response time) that may be greater than the rate of action updates. Parameters of a subsequent command within the sequence may depend on the plant state (e.g., the exact location and/or position of the arm joints) that may become available to the predictor via the plant feedback.

The sensory input and/or the plant feedback may collectively be referred to as sensory context. The context may be utilized by the predictor 422 in order to produce the predicted output 418. By way of a non-limiting illustration of obstacle avoidance by an autonomous rover, an image of an obstacle (e.g., wall representation in the sensory input 406) may be combined with rover motion (e.g., speed and/or direction) to generate Context_A. When the Context_A is encountered, the control output 420 may comprise one or more commands configured to avoid a collision between the rover and the obstacle. Based on one or more prior encounters of the Context_A—avoidance control output, the predictor may build an association between these events as described in detail below.

The combiner 414 may implement a transfer function h( ) configured to combine the control signal 408 and the predicted control signal 418. In some implementations, the combiner 414 operation may be expressed as described in detail in co-owned and co-pending U.S. patent application Ser. No. 13/842,530 entitled "ADAPTIVE PREDICTOR APPARATUS AND METHODS", filed Mar. 15, 2013, as follows:

$$\hat{u}=h(u,u^P). \quad (Eqn. 1)$$

Various realizations of the transfer function of Eqn. 1 may be utilized. In some implementations, the transfer function may comprise an addition operation, a union, a logical 'AND' operation, and/or other operations.

In one or more implementations, the transfer function may comprise a convolution operation. In spiking network realizations of the combiner function, the convolution operation may be supplemented by use of a finite support kernel such as Gaussian, rectangular, exponential, and/or other finite support kernel. Such a kernel may implement a low pass filtering operation of input spike train(s). In some implementations, the transfer function may be characterized by a commutative property configured such that:

$$\hat{u}=h(u,u^P)=h(u^P,u). \quad (Eqn. 2)$$

In one or more implementations, the transfer function of the combiner 414 may be configured as follows:

$$h(0,u^P)=u^P. \quad (Eqn. 3)$$

In some implementations, the transfer function h may be configured as:

$$h(u,0)=u. \quad (Eqn. 4)$$

In some implementations, the transfer function h may be configured as a combination of realizations of Eqn. 3-Eqn. 4 as:

$$h(0,u^P)=u^P, \text{ and } h(u,0)=u, \quad (Eqn. 5)$$

In one exemplary implementation, the transfer function satisfying Eqn. 5 may be expressed as:

$$h(u,u^P)=(1-u)\times(1-u^P)-1. \quad (Eqn. 6)$$

In one such realization, the combiner transfer function configured according to Eqn. 3-Eqn. 6, thereby implementing an additive feedback. In other words, output of the predictor (e.g., 418) may be additively combined with the control signal (408) and the combined signal 420 may be used as the teaching input (404) for the predictor. In some implementations, the combined signal 420 may be utilized as an input (context) signal 428 into the predictor 422.

In some implementations, the combiner transfer function may be characterized by a delay expressed as:

$$\hat{u}(t_{i+1})=h(u(t_i),u^P(t_i)). \quad (Eqn. 7)$$

In Eqn. 7, $\hat{u}(t_{i+1})$ denotes combined output (e.g., 420 in FIG. 4) at time $t+\Delta t$. As used herein, symbol $t_N$ may be used to refer to a time instance associated with individual controller update events (e.g., as expressed by Eqn. 7), for example $t_1$ denoting time of the first control output, e.g., a simulation time step and/or a sensory input frame step. In some implementations of training autonomous robotic devices (e.g., rovers, bi-pedaling robots, wheeled vehicles, aerial drones, robotic limbs, and/or other robotic devices), the update periodicity $\Delta t$ may be configured to be between 1 ms and 1000 ms.

In some implementations, the transfer function may implement "veto" or "overriding" function such that if u is not present (or zero), then the output is $u^P$; otherwise, the output is u regardless of the value of $u^P$. It will be appreciated by those skilled in the art that various other realizations of the transfer function of the combiner 414 (e.g., comprising a Heaviside step function, a sigmoidal function, such as the hyperbolic tangent, Gauss error function, or logistic function, and/or a stochastic operation) may be applicable.

Operation of the predictor 422 learning process may be aided by a teaching signal 404. As shown in FIG. 4, the teaching signal 404 may comprise the output 420 of the combiner:

$$u^d = \hat{u}. \quad \text{(Eqn. 8)}$$

In some implementations wherein the combiner transfer function may be characterized by a delay $\tau$ (e.g., Eqn. 7), the teaching signal at time $t_i$ may be configured based on values of u, $u^P$ at a prior time $t_{i-1}$, for example as:

$$u^d(t_i) = h(u(t_{i-1}), u^P(t_{i-1})). \quad \text{(Eqn. 9)}$$

The training signal $u^d$ at time $t_i$ may be utilized by the predictor in order to determine the predicted output $u^P$ at a subsequent time $t_{i+1}$, corresponding to the context (e.g., the sensory input x) at time $t_i$:

$$u^P(t_{i+1}) = F[x_i, W(u^d(t_i))]. \quad \text{(Eqn. 10)}$$

In Eqn. 10, the function W may refer to a learning process implemented by the predictor.

In one or more implementations, such as illustrated in FIG. 4, the sensory input 406, the control signal 408, the predicted output 418, the combined output 420 and/or plant feedback 416, 436 may comprise spiking signal, analog signal, and/or a combination thereof. Analog to spiking and/or spiking to analog signal conversion may be effectuated using, mixed signal spiking neuron networks, such as, for example, described in co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, and issued as U.S. Pat. No. 9,213,937 on Dec. 15, 2015, incorporated supra.

Output 420 of the combiner e.g., 414 in FIG. 4, may be gated. In some implementations, the gating information may be provided to the combiner by the control entity 412. In one such realization of spiking controller output, the control signal 408 may comprise positive spikes indicative of a control command and configured to be combined with the predicted control signal (e.g., 418); the control signal 408 may comprise negative spikes, where the timing of the negative spikes is configured to communicate the control command, and the (negative) amplitude sign is configured to communicate the combination inhibition information to the combiner 414 so as to enable the combiner to 'ignore' the predicted control signal 418 for constructing the combined output 420.

In some implementations of spiking signal output, the combiner 414 may comprise a spiking neuron network; and the control signal 408 may be communicated via two or more connections. One such connection may be configured to communicate spikes indicative of a control command to the combiner neuron; the other connection may be used to communicate an inhibitory signal to the combiner network. The inhibitory signal may inhibit one or more neurons of the combiner the one or more combiner input neurons of the combiner network thereby effectively removing the predicted control signal from the combined output (e.g., 420 in FIG. 4).

The gating information may be provided to the combiner via a connection 424 from another entity (e.g., a human operator controlling the system with a remote control, and/or external controller) and/or from another output from the controller 412 (e.g. an adapting block, or an optimal controller). In one or more implementations, the gating information delivered via the connection 424 may comprise one or more of: a command, a memory address of a register storing a flag, a message, an inhibitory efficacy, a value (e.g., a weight of zero to be applied to the predicted control signal by the combiner), and/or other information capable of conveying gating instructions to the combiner.

The gating information may be used by the combiner network to inhibit and/or suppress the transfer function operation. The suppression (or 'veto') may cause the combiner output (e.g., 420) to be comprised solely of the control signal portion 418, e.g., configured in accordance with Eqn. 4. In one or more implementations the gating information 424 may be used to suppress ('veto') provision of the context signal 428 to the predictor without affecting the combiner output 420. In one or more implementations the gating information 424 may be used to suppress ('veto') the feedback 416_1 from the plant.

In one or more implementations, the gating signal 424 may comprise an inhibitory indication that may be configured to inhibit the output from the combiner. Zero combiner output may, in some realizations, may cause zero teaching signal (e.g., 414 in FIG. 4) to be provided to the predictor so as to signal to the predictor a discrepancy between the target action (e.g., controller output 408) and the predicted control signal (e.g., output 418).

The gating signal 424 may be used to veto predictor output 418 based on, for example, the predicted control output 418 being away from the target output by more than a given margin. The margin may be configured based on an application and/or state of the trajectory. For example, a smaller margin may be applicable in navigation applications wherein the platform is proximate to a hazard (e.g., a cliff) and/or an obstacle. A larger error may be tolerated when approaching one (of many) targets.

By way of a non-limiting illustration, if the turn is to be completed and/or aborted (due to, for example, a trajectory change and/or sensory input change), and the predictor output may still be producing turn instruction to the plant, the gating signal may cause the combiner to veto (ignore) the predictor contribution and to pass through the controller contribution.

Predicted control signal 418 and the control input 408 may be of opposite signs. In one or more implementations, positive predicted control signal (e.g., 418) may exceed the target output that may be appropriate for performance of as task. Control signal 408 may be configured to comprise negative signal in order to compensate for overprediction by the predictor.

Gating and/or sign reversal of controller output may be useful, for example, responsive to the predictor output being incompatible with the sensory input (e.g., navigating towards a wrong target). Rapid (compared to the predictor learning time scale) changes in the environment (e.g., appearance of a new obstacle, target disappearance), may require a capability by the controller (and/or supervisor) to 'override' predictor output. In one or more implementations compensation for overprediction may be controlled by a graded form of the gating signal delivered via the connection 424.

In some implementations, predictor learning process may be configured based on one or more look-up tables (LUT).

Table 1 and Table 2 illustrate use of look up tables for learning obstacle avoidance behavior.

Table 1-Table 2 present exemplary LUT realizations characterizing the relationship between sensory input (e.g., distance to obstacle d) and control signal (e.g., turn angle α relative to current course) obtained by the predictor during training Columns labeled N in Table 1-Table 2, present use occurrence N (i.e., how many times a given control action has been selected for a given input, e.g., distance). Responsive to the selection of a given control action (e.g., turn of 15°) based on the sensory input (e.g., distance from an obstacle of 0.7 m), the counter N for that action may be incremented. In some implementations of learning comprising opposing control actions (e.g., right and left turns shown by rows 3-4 in Table 2), responsive to the selection of one action (e.g., turn of +15°) during learning, the counter N for that action may be incremented while the counter for the opposing action may be decremented.

As seen from the example shown in Table 1, as a function of the distance to obstacle falling to a given level (e.g., 0.7 m), the controller may produce a turn command. A 15° turn is most frequently selected during training for distance to obstacle of 0.7 m. In some implementations, predictor may be configured to store the LUT (e.g., Table 1) data for use during subsequent operation. During operation, the most frequently used response (e.g., turn of 15°) may be output for a given sensory input, in one or more implementations, In some implementations, the predictor may output an average of stored responses (e.g., an average of rows 3-5 in Table 1).

TABLE 1

| d | α° | N |
|---|---|---|
| 0.9 | 0 | 10 |
| 0.8 | 0 | 10 |
| 0.7 | 15 | 12 |
| 0.7 | 10 | 4 |
| 0.7 | 5 | 1 |
| ... | | |
| 0.5 | 45 | 3 |

TABLE 2

| d | α° | N |
|---|---|---|
| 0.9 | 0 | 10 |
| 0.8 | 0 | 10 |
| 0.7 | 15 | 12 |
| 0.7 | −15 | 4 |
| ... | | |
| 0.5 | 45 | 3 |

The adaptive controller 400 may be configured indicate a condition wherein the predicted signal 418 may match the teaching signal (e.g., successful prediction). The prediction success may be configured based on an error measure breaching a threshold. In some implementations, the error measure may be configured based on a difference, mean squared error, deviation, a norm, and/or other operation.

Figure 11A:
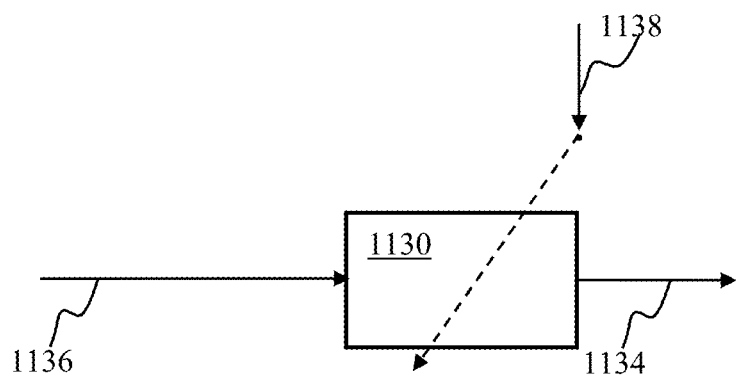
FIG. 11A is a block diagram illustrating an adaptive predictor apparatus for use with, e.g., system of FIGS. 2A-2B, according to one or more implementations.

FIG. 11A illustrates an adaptive predictor apparatus for use with, e.g., system of FIGS. 2A-2B, according to one or more implementations. Predictor 1130 may be configured to receive sensory input 1136. In some implementations, such as navigation, classification, object recognition, and/or obstacle avoidance, the sensory input 1336 may comprise a stream of pixel values associated with one or more digital images. In one or more implementations of e.g., video, radar, sonography, x-ray, magnetic resonance imaging, and/or other types of sensing, the input may comprise electromagnetic waves (e.g., visible light, infrared (IR), ultraviolet (UV), and/or other types of electromagnetic waves) entering an imaging sensor array. In some implementations, the imaging sensor array may comprise one or more of retinal ganglion cells (RGC)s, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure.

The predictor may operate a learning process configured to produce output 1134. In some implementations of robotic operation and/or control, the output may comprise one or more control instructions to a robotic device (e.g., the instructions in the output 122 of FIG. 1A). The predictor 1130 learning process may be configured based on teaching input 1138. In some implementations of robotic operation and/or control, the teaching input 1138 may comprise control instructions (e.g., 106, 156 in FIGS. 1A, 1C) provided to the robotic device by a training/operating entity (e.g., a user, and/or computerized agent).

In some implementations, the predictor learning process may comprise a supervised learning process, e.g., a perceptron. For a given occurring context, the perceptron may be configured to learn to produce a control output 1134 that is most appropriately associated with the occurring context. Various learning methodologies may be utilized to determine target output, including for example, training the learning process using a training set (e.g., comprising a plurality of robot actions responsive to a plurality of control). The learning process may be characterized by a performance measure configured to characterize quality of the association (a measure of appropriateness). In some implementations, the performance measure may comprise an error, determined based on a comparison of the actual output 1134 and target output (as indicated by the input 1138). Various techniques may be utilized in order to determine learning duration including but not limited to a target training time, target minimum performance (e.g., error breaching a target threshold), time averaged performance, degradation in time averaged performance, and/or other techniques.

In some implementations of learning by a neuron network, available data may be divided into three portions. The first portion may comprise a training portion, and may be used for computing the gradient and updating the network weights. The second portion may comprise a validation portion. Predictor performance when operating on the validation portion may be is monitored during the training process. In some implementations, the validation performance may comprise an error that may normally decrease during the initial phase of training. In order to prevent over fit of the data by the network, the training may be terminated based on a detection of an increase of the validation error. The validation error increase may be determined based on the error rising by a target amount and/or a target percentage (e.g., 1-10%) for a specified number of iterations (e.g., hundreds of iterations).

Figure 11B:
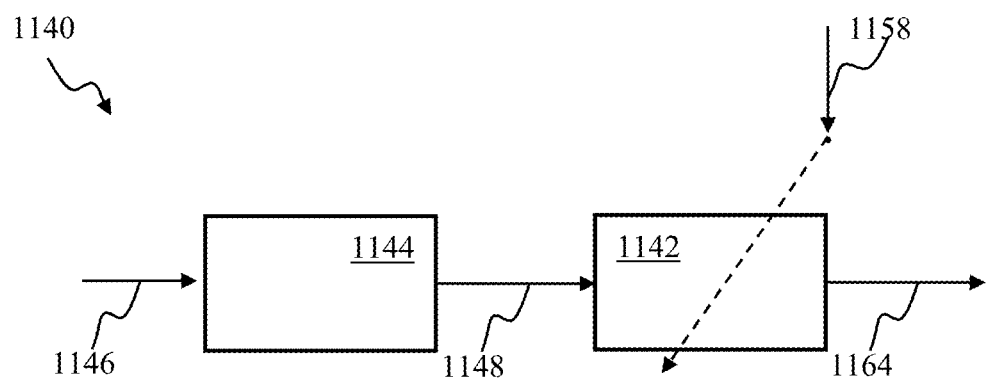
FIG. 11B is a block diagram illustrating a learning controller comprising a feature extractor and an adaptive predictor, according to one or more implementations.

FIG. 11B illustrates a learning controller apparatus comprising a feature extractor and an adaptive predictor, according to one or more implementations. The apparatus 1140 may comprise an adaptive predictor 1142 coupled to a feature extractor 1144. The feature extractor 1144 may be configured to receive sensory input 1146 and to reduce the dimension of the sensory input, compress the input, or represent it in a form that is appropriate for the predictor (e.g., make it linearly classifiable). A feature extractor may apply filtering to inputs, e.g., applying color range or color histogram filtering. A feature extractor may apply temporal, spatial, or temporal-spatial filtering including high-pass filtering, Gabor or wavelet filtering. Feature extractors may also adapt to or otherwise reflect the statistics of their inputs, e.g., becoming sensitive to deviations from normal statistical distributions and serving as novelty detectors. In some implementations, such as navigation, classification, object recognition, and/or obstacle avoidance, the sensory input 1146 may comprise the input 1106 described above with respect to FIG. 11A. Based on processing of the sensory input 1146, the feature extractor 1144 may provide information related to one or more features in the input 1146 to the predictor 1142 via pathway 1148. For example, the feature extractor may produce a low-dimensional map showing the location of the robot or a target. In some implementations, the feature extractor may provide information related to identity of an object in the environment, and/or project the sensory input into a low-dimensional feature space corresponding to the configuration of the robot. Outputs of the feature extractors may include one or more of the following: a binary heat map of target locations identified as high probability spatial locations of target object, novelty unexpected occurrence of an event, and/or features, numerical coordinates in ego central or allocentric coordinate frames of target objects, events, and/or features, categorical labels or tags indicating the transient, continuing, or intermittent presence of a particular input (e.g., a voice command, a hand gesture, a light indicator, a sound, an object such as a toy or a person, and/or signage).

The predictor 1142 may operate a learning process configured to produce output 1164. In some implementations of robotic operation and/or control, the output may comprise one or more control instructions to a robotic device (e.g., the instructions in the output 122 of FIG. 1A). The predictor 1142 learning process may be configured based on teaching input 1148. In some implementations of robotic operation and/or control, the teaching input 1148 may comprise control instructions (e.g., 106, 156 in FIGS. 1A, 1C) provided to the robotic device by a training/operating entity (e.g., a user, and/or computerized agent).

In some implementations, the predictor 1142 learning process may comprise a supervised learning process, e.g., a perceptron, or a multi-layer perceptron. For a given occurring context determined based on the feature extractor output 1148, the perceptron 1142 may be configured to learn to produce a control output 1164 that is most appropriately associated with the occurring context. Various learning methodologies may be utilized to determine target output, including for example, those described above with respect to FIG. 11A.

In some implementations, predictor 1130 and/or 1142 may comprise a neuron network configured to implement error back propagation process using, e.g., methodology described in U.S. patent application Ser. No. 14/054,366, entitled "APPARATUS AND METHODS FOR BACKWARD PROPAGATION OF ERRORS IN A SPIKING NEURON NETWORK", filed Oct. 15, 2013, and issued as U.S. Pat. No. 9,489,623 on Nov. 8, 2016, the foregoing being incorporated herein by reference in its entirety.

Figure 14B:
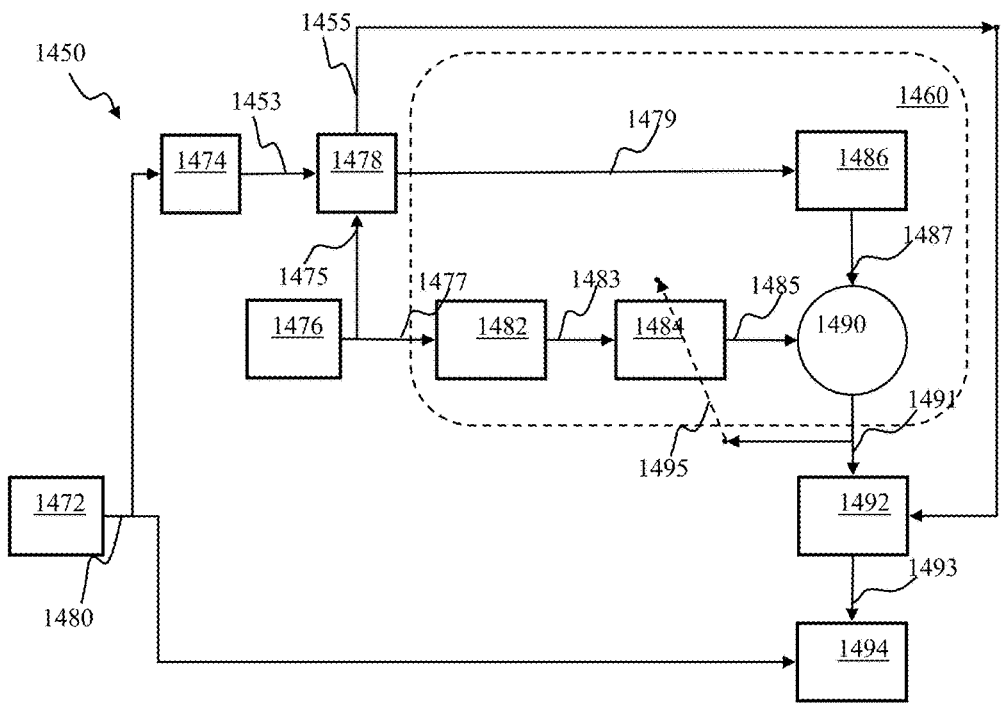
FIG. 14B is a block diagram illustrating a system comprising a learning apparatus comprising a combiner configured for controlling a robotic platform, according to one or more implementations.
Figure 14A:
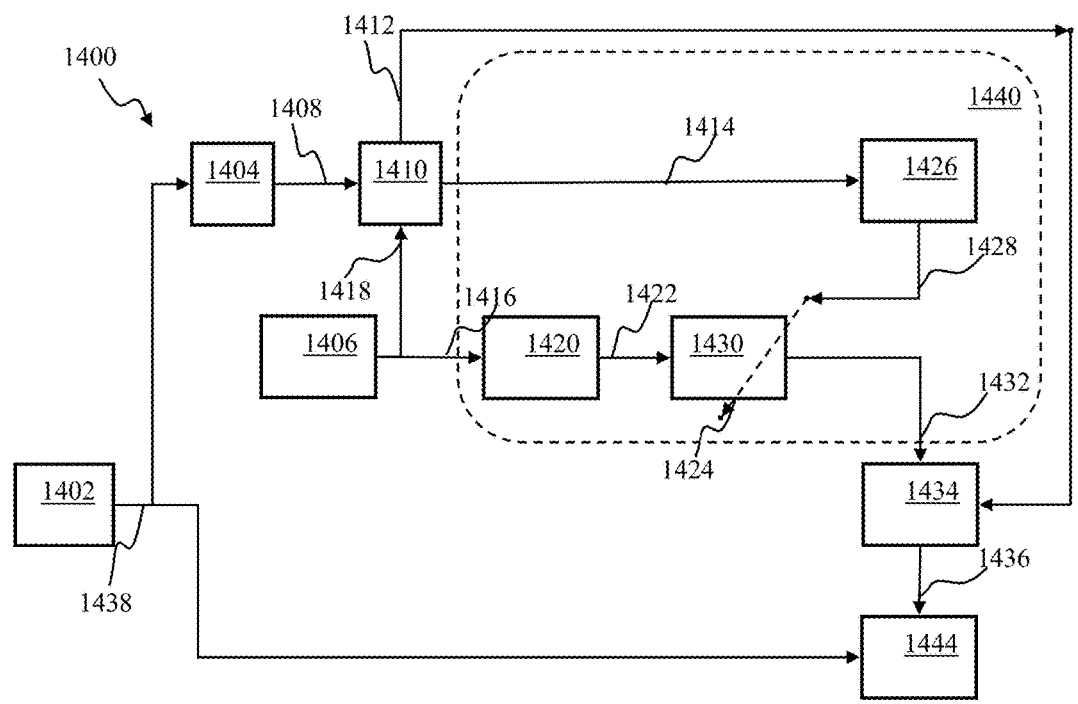
FIG. 14A is a block diagram illustrating a system comprising a learning apparatus configured for controlling a robotic platform, according to one or more implementations.

FIG. 14A illustrates a system comprising a learning apparatus configured for controlling a robotic platform of e.g., FIGS. 1A-2B, according to one or more implementations. The system 1400 of FIG. 14A may comprise learning remote control apparatus 1440 configured to operate a robotic device. The apparatus 1440 may be trained using a remote control device 1402. In one or more implementations, the device 1402 may comprise a remote control handset (e.g., 102 in FIG. 1A) operable by a human performing a target task (e.g., following a figure eight trajectory with the robotic device 1444). In some implementations, the remote control device 1402 may comprise a computerized agent (e.g., comprising a trained adaptive controller 400 of FIG. 4) and configured to operate the robotic device 1444 in accordance with a target trajectory (e.g., operate the device 1444 to follow a figure-8 trajectory shown in FIG. 16A). The remote controller device 1402 may comprise a remote transmitter (e.g., IR, RF, light) configured to provide one or more commands via transmissions 1438 to the robotic device 1444. In some implementations, the transmissions 1438 may comprise the transmissions 106 in FIG. 1A provided via a remote control handset 102 to the robotic device 104.

The system 1400 may comprise a receiver component 1404 configured to provide information related to control commands 1438 that may cause the task execution by the device 1444. In some implementations, the component 1404 may comprise an IR receiver configured to detect remote command transmissions by the device 1402.

The system 1400 may further comprise a sensor component 1406 configured to provide information related to task execution by the device 1444. In some implementations, such as navigation, classification, object recognition, and/or obstacle avoidance, the information 1416 provided by the sensor component 1406 may comprise the input 1106 described above with respect to FIG. 11A (e.g., stream of video frames).

The system 1400 may comprise a learning controller logic 1410 configured to detect remote command transmissions in the output 1406 of the component 1404. In some implementations, the logic 1410 may provide a plurality of channels wherein individual channels are configured to convey information associated with individual control actions. By way of an illustration, for a remote controller 1402 comprising 4 control options (e.g., 4 buttons, one for each of forward, backward, left, and right) individual channels of the logic 1410 may convey information related to activity of individual control options, e.g., as illustrated in Table 3, below.

TABLE 3

| Action | Channel 1 | Channel 2 | Channel 3 | Channel 4 |
|---|---|---|---|---|
| Forward | 1 | 0 | 0 | 0 |
| Backward | 0 | 1 | 0 | 1 |
| Left | 0 | 0 | 1 | 0 |
| Right | 0 | 0 | 0 | 1 |

The system 1450 may comprise a feature extractor 1420, an adaptive predictor 1430, and a controller 1426 (also referred to as the adapter) components. The components 1420, 1430, 1426 may collectively be referred to as the Brain Operating System (BrainOS™ component) denoted by a broken line shape 1440 in FIG. 14A. The BrainOS™ component may be operable to enable robots to be teachable. A robot equipped with BrainOS™ may be trained to follow paths, react to its environment, approach target objects, and/or avoid obstacles, and/or manipulate objects in the environment. These behaviors may be chained together and/or organized hierarchically in order to create increasingly complex behaviors.

The feature extractor 1420 may receive sensory input 1416 from the sensor component 1406. In some implementations wherein the sensor 1406 may comprise a camera (e.g., 112, 166 in FIGS. 1A, 1C) the sensor output 1416 may comprise a stream of digital pixel values. In some implementations, such as navigation, classification, object recognition, and/or obstacle avoidance, the sensory input 1416 into the feature extractor 1420 may comprise the input 1106 described above with respect to FIG. 11A. Based on processing of the sensory input 1416, the feature extractor 1420 may provide information related to one or more features in the input 1416 to the predictor 1430 via pathway 1422. For example, the feature extractor may produce a low-dimensional map showing the location of the robot or a target. The feature extractor may provide information related to identity of an object in the environment, and/or project the sensory input into a low-dimensional feature space corresponding to the configuration of the robot. The information 1422 may be referred to as context for the predictor 1430.

The predictor 1430 may operate a learning process configured to produce output 1485. In some implementations of robotic operation and/or control, the output may comprise one or more control instructions for operating a robotic device 1444 (e.g., the instructions in the output 122 of FIG. 1A).

The adapter component 1426 may be configured to adapt format of the output 1414 of the logic 1410 to specific format of the predictor 1430 learning process. By way of an illustration, the predictor learning process may be configured to operate using a tri-state logic convention wherein 1 may denote activation of a signal; 0 may denote signal de-activation; and 0.5 may denote leave the signal as is (e.g., maintain active or inactive). The adapter component 1426 may convert binary control input 1414 detected by the logic 1410 into tri-state logic, in some implementations. By way of an illustration, a "FORWARD" command signal 1414 may be expressed as {1,0,0,0} while output 1428 of the adapter component 1426 may be configured as {1, 0.5, 0.5, 0.5}.

The predictor 1430 learning process may be configured based on teaching input 1424, comprising output of the adapter 1426. In some implementations of robotic operation and/or control, the teaching input 1424 may comprise a target output, e.g., as described above with respect to FIG. 4. By way of an illustration, during training a user may operate the robotic vehicle 274 of FIG. 2C using a remote controller 262. The remote transmissions produced by the controller 266 may be configured to communicate one or more instructions configured to cause the robotic vehicle to perform a task (e.g., approach a target and take an image of the target using a camera 278). The camera 278 may comprise still and/or video camera. Output of the camera 278 may be provided to a learning remote controller 270 via link 276 in order to produce sensory context (e.g., 1422 in FIG. 14A) associated with the task execution by the vehicle 274. The learning remote controller 270 may comprise an adaptive predictor (e.g., the predictor 1430 of FIG. 14B). The predictor may develop associations between context and the corresponding control instructions provided by the user during training. The learning remote controller 270 may be operable to produce a predicted control instructions (e.g., 1432 in FIG. 14B) based on the present context and previously learned associations. The predicted control instructions may be communicated to the vehicle 274 via transmissions 268. In one or more implementations, the transmissions 266, 268 may be effectuated based on any applicable carrier (e.g., RF, IR, pressure wave, and/or other).

The learning remote controller may comprise logic configured to implement a time division multiple access wherein the transmissions 268 may be scheduled to occur in time intervals wherein the transmissions 266 are absent. Such implementation may prevent cross interference between the user control instructions and the automatically generated control instructions. It will be recognized by those skilled in the arts that other multiple access methodologies may be utilized, e.g., code division, frequency division, and/or other. As the training progresses, the user control input 266 may diminish with the learning remote controller taking over. One such implementation of gradual "knowledge transfer" from the user to the controller is described in U.S. patent application Ser. No. 13/842,583 entitled "APPARATUS AND METHODS FOR TRAINING OF ROBOTIC DEVICES", filed Mar. 15, 2013, incorporated supra. By way of an illustration, initially a user may control the vehicle 274 to flow a figure eight trajectory via transmissions 266. Based on a plurality of trials, the learning controller may automatically begin issuing commands via the transmissions 268 to the vehicle. The user may stop (or pause) issuing commands 266 while monitoring the performance of the trajectory navigation by the vehicle 274. Based on observing a discrepancy between a target trajectory and actual trajectory, the user may issue a correction.

It is noteworthy that the control system of the learning controller (e.g., comprising the control system 1400 shown and described with respect to FIG. 14A) may be configured absent a combiner component.

In some implementations, the predictor 1430 learning process may comprise a supervised learning process, e.g., a perceptron. In one or more implementations, the predictor operation may be configured in accordance with methodology described in U.S. patent application Ser. No. 13/842,530 entitled "ADAPTIVE PREDICTOR APPARATUS AND METHODS", filed Mar. 15, 2013, U.S. patent application Ser. No. 13/842,562 entitled "ADAPTIVE PREDICTOR APPARATUS AND METHODS FOR ROBOTIC CONTROL", filed Mar. 15, 2013, U.S. patent application Ser. No. 13/842,616 entitled "ROBOTIC APPARATUS AND METHODS FOR DEVELOPING A HIERARCHY OF MOTOR PRIMITIVES", filed Mar. 15, 2013, U.S. patent application Ser. No. 13/842,647 entitled "MULTICHANNEL ROBOTIC CONTROLLER APPARATUS AND METHODS", filed Mar. 15, 2013, and U.S. patent application Ser. No. 13/842,583 entitled "APPARATUS AND METHODS FOR TRAINING OF ROBOTIC DEVICES", filed Mar. 15, 2013, incorporated supra.

The adaptive controller 400 may be configured indicate a condition wherein the predicted signal 418 may match the teaching signal (e.g., successful prediction). The prediction success may be configured based on an error measure breaching a threshold. In some implementations, the error measure may be configured based on a difference, mean squared error, deviation, a norm, and/or other operation. In one or more implementations, the indication may comprise one or more of an audible indication (beep), visible indication (a flashing LED), a communication to a display (e.g., update training progress graphical user interface element), and/or other.

The predictor 1430 output 1432 may comprise one or more motor commands (e.g., pan camera to the right, turn right wheel forward), sensor acquisition parameters (e.g., use high resolution camera mode), and/or other parameters. In some implementations, wherein the BrainOS component may be disposed remote from the robotic device (e.g., as illustrated in FIGS. 1A-1C). The predicted output 1432 may be coupled to a transmitter component 1434. The transmitter 1434 may comprise an RF, IR, sound, light, and/or other emission technology configured to transform input 1432 to output 1436 that may be compatible with the device 1444. The transmitter component 1434 may be provided with information for transcoding BrainOS signal format 1432 into robot-specific format 1436. In some implementations, the transmitter 1432 may receive such information from the component 1410 via pathway 1412. In one or more implementations, the components 1410, 1434 may access a bi-directional look up table comprising transcoding information (e.g., information in Table 3). In some implementations, operation of the system 1400 of FIG. 14A may comprise operations described with respect to FIG. 8B, below.

FIG. 14B illustrates a system comprising a learning apparatus comprising a combiner configured for controlling a robotic platform of e.g., FIGS. 1A-2B, according to one or more implementations. The system 1450 of FIG. 14B may comprise learning remote control apparatus 1460 configured to operate a robotic device. The apparatus 1460 may be trained using a remote control device 1472. In one or more implementations, the device 1472 may comprise a remote control handset (e.g., 102 in FIG. 1A) operable by a human performing a target task (e.g., following a figure eight trajectory with the robotic device 1494). In some implementations, the device 1472 may comprise a computerized agent (e.g., comprising a trained adaptive controller 400 of FIG. 4) and configured to operate the robotic device 1494 in accordance with a target trajectory (e.g., operate the device 1494 to follow a figure-8 trajectory shown in FIG. 16A). The device 1472 may comprise a remote transmitter (e.g., IR, RF, light) configured to provide one or more commands via transmissions 1480 to the robotic device 1494. In some implementations, the transmissions 1480 may comprise the transmissions 106 in FIG. 1A provided via a remote control handset 102 to the robotic device 104.

The system 1450 may comprise a receiver component 1474 configured to provide information related to control commands 1480 that may cause the task execution by the device 1494. In some implementations, the component 1474 may comprise an IR receiver configured to detect remote command transmissions by the device 1472.

The system 1450 may further comprise a sensor component 1476 configured to provide information related to task execution by the device 1494. In some implementations, such as navigation, classification, object recognition, and/or obstacle avoidance, the information 1477 provided by the sensor component 1476 may comprise the input 1106 described above with respect to FIG. 11A (e.g., stream of video frames).

The system 1400 may comprise a learning controller logic 1478 configured to detect remote command transmissions in the output 1453 of the component 1474. In some implementations, the logic 1478 may comprise a plurality of channels wherein individual channels are configured to convey information associated with individual control actions, e.g., such as described above with respect to Table 3. 50 may comprise a feature extractor 1482, an adaptive predictor 1484, a combiner 1490, and a controller 1486 (also referred to as the adapter) components. The components 1482, 1484, 1486, 1490 may collectively be referred to as the Brain Operating System (BrainOS™ component) denoted by a broken line shape 1460 in FIG. 14B. The BrainOS™ component may be operable to enable robots to be teachable. A robot equipped with BrainOS™ may be trained to follow paths, react to its environment, approach target objects, and/or avoid obstacles, and/or manipulate objects in the environment. These behaviors may be chained together and/or organized hierarchically in order to create increasingly complex behaviors.

The feature extractor 1482 may receive sensory input 1477 from the sensor component 1476. In some implementations wherein the sensor 1476 comprises a camera (e.g., 112, 166 in FIGS. 1A, 1C) the sensor output 1477 may comprise a stream of digital pixel values. In some implementations, such as navigation, classification, object recognition, and/or obstacle avoidance, the sensory input 1477 into the feature extractor 1482 may comprise the input 1106 described above with respect to FIG. 11A. Based on processing of the sensory input 1477, the feature extractor 1482 may provide information related to one or more features in the input 1477 to the predictor 1484 via pathway 1483. For example, the feature extractor may produce a low-dimensional map showing the location of the robot or a target. The feature extractor may provide information related to identity of an object in the environment, and/or project the sensory input into a low-dimensional feature space corresponding to the configuration of the robot. The information 1483 may be referred to as context for the predictor 1484.

The predictor 1484 may operate a learning process configured to produce output 1485. In some implementations of robotic operation and/or control, the output may comprise one or more control instructions for operating a robotic device 1494 (e.g., the instructions in the output 122 of FIG. 1A).

The adapter component 1486 may be configured to adapt format of the output 1479 of the logic 1478 to specific format of the predictor 1484 learning process. By way of an illustration, the predictor learning process may be configured to operate using a tri-state logic convention wherein 1 may denote activation of a signal; 0 may denote signal de-activation; and 0.5 may denote leave the signal as is (e.g., maintain active or inactive as indicated by the predictor 1430). The adapter component 1486 may convert binary control input 1479 detected by the logic 1478 into tri-state logic, in some implementations. By way of an illustration, a "FORWARD" command signal 1479 may be expressed as {1,0,0,0} while output 1487 of the adapter component 1486 may be configured as {1, 0.5, 0.5, 0.5}.

The predictor 1484 learning process may be configured based on teaching input 1495, comprising output of the combiner 1490. In some implementations of robotic operation and/or control, the teaching input 1495 may comprise a target output, e.g., as described above with respect to FIG. 4.

In some implementations, the predictor 1484 learning process may comprise a supervised learning process, e.g., a perceptron. In one or more implementations, the predictor operation may be configured in accordance with methodology described in U.S. patent application Ser. No. 13/842,530 entitled "ADAPTIVE PREDICTOR APPARATUS AND METHODS", filed Mar. 15, 2013, U.S. patent application Ser. No. 13/842,562 entitled "ADAPTIVE PREDICTOR APPARATUS AND METHODS FOR ROBOTIC CONTROL", filed Mar. 15, 2013, U.S. patent application Ser. No. 13/842,616 entitled "ROBOTIC APPARATUS AND METHODS FOR DEVELOPING A HIERARCHY OF MOTOR PRIMITIVES", filed Mar. 15, 2013, U.S. patent application Ser. No. 13/842,647 entitled "MULTICHAN- NEL ROBOTIC CONTROLLER APPARATUS AND METHODS", filed Mar. 15, 2013, and U.S. patent application Ser. No. 13/842,583 entitled "APPARATUS AND METHODS FOR TRAINING OF ROBOTIC DEVICES", filed Mar. 15, 2013, incorporated supra.

The predictor 1484 and the combiner 1490 may cooperate to produce a control output 1491 for the robotic device 1494. In one or more implementations, the output 1491 may comprise one or more motor commands (e.g., pan camera to the right, turn right wheel forward), sensor acquisition parameters (e.g., use high resolution camera mode), and/or other parameters. In some implementations, wherein the BrainOS component may be disposed remote from the robotic device (e.g., as illustrated in FIGS. 1A-1C). Output 1491 of the combiner 1490 may be coupled to a transmitter component 1492. The transmitter 1492 may comprise an RF, IR, sound, light, and/or other emission technology configured to transform input 1491 to output 1493 that may be compatible with the device 1494. The transmitter component 1492 may be provided with information for transcoding BrainOS signal format 1491 into robot-specific format 1493. In some implementations, the transmitter 1492 may receive such information from the component 1478 via pathway 1455. In one or more implementations, the components 1478, 1492 may access a bi-directional look up table comprising transcoding information (e.g., information in Table 3). In some implementations, operation of the system 1450 of FIG. 14B may comprise operations described with respect to FIG. 8B, below.

Figure 5:
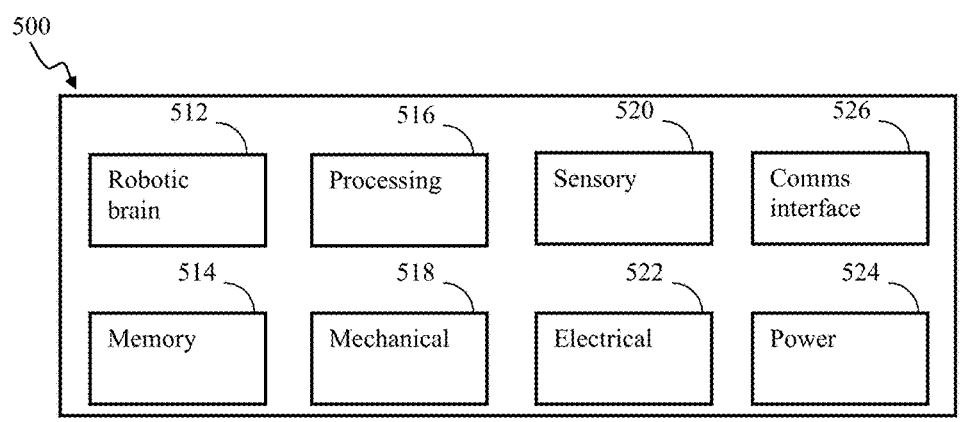
FIG. 5 is a functional block diagram detailing components of a learning remote control apparatus, in accordance with one implementation.

FIG. 5 is a functional block diagram detailing components of a learning remote control apparatus of, e.g., system of FIG. 1A, in accordance with one implementation. The learning remote control apparatus 500 may comprise a robotic brain 512 for control of the device. Additional memory 514 and processing capacity 516 is available for other hardware/firmware/software needs of the robotic device. The processing module may interface to the sensory module in order to perform sensory processing, e.g., object detection, face tracking, stereo vision, and/or other tasks.

In some implementations, the robotic brain 512 interfaces with the mechanical 518, sensory 520, electrical 522, and power components 524, and communications interface 526 via driver interfaces and software abstraction layers. Additional processing and memory capacity may be used to support these processes. It will be appreciated that these components may be fully controlled by the robotic brain. The memory and processing capacity may also aid in brain image management for the robotic device (e.g. loading, replacement, operations during a startup, and/or other operations). Consistent with the present disclosure, the various components of the device may be remotely disposed from one another, and/or aggregated. For example, the robotic brain may be executed on a server apparatus, and control the mechanical components via network or radio connection while memory or storage capacity may be integrated into the brain. Multiple mechanical, sensory, or electrical units may be controlled be a single robotic brain via network/radio connectivity.

The mechanical components 518 may include virtually any type of device capable of motion or performance of a desired function or task. These may include, without limitation, motors, servos, pumps, hydraulics, pneumatics, stepper motors, rotational plates, micro-electro-mechanical devices (MEMS), electroactive polymers, and/or other mechanical components. The devices interface with the robotic brain and enable physical interaction and manipulation of the device.

The sensory devices 520 allow the robotic device to accept sensory input from external entities. These may include, without limitation, video, audio, capacitive, radio, vibrational, ultrasonic, infrared, and temperature sensors radar, lidar and/or sonar, and/or other sensory devices.

The electrical components 522 include virtually any electrical device for interaction and manipulation of the outside world. This may include, without limitation, light/radiation generating devices (e.g. LEDs, IR sources, light bulbs, and/or other devices), audio devices, monitors/displays, switches, heaters, coolers, ultrasound transducers, lasers, and/or other electrical components. These devices may enable a wide array of applications for the robotic apparatus in industrial, hobbyist, building management, medical device, military/intelligence, and other fields (as discussed below).

The communications interface 526 may include one or more connections to external computerized devices to allow for, inter alia, management of the robotic device, e.g., as described above with respect to FIG. 2A and/or below with respect to FIG. 10. The connections may include any of the wireless or wireline interfaces discussed above, and further may include customized or proprietary connections for specific applications. In some implementations, the communications interface 526 may comprise a module (e.g., the dongle 216 in FIG. 2A), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the learning controller apparatus (e.g., 210 in FIG. 2A and/or 1010 in FIG. 10) and a remote computing entity (e.g., 1006 or 1004 in FIG. 10).

The power system 524 may be tailored to the needs of the application of the device. For example, for a small hobbyist robot, a wireless power solution (e.g. battery, solar cell, inductive (contactless) power source, rectification, and/or other) may be appropriate. For building management applications, battery backup/direct wall power may be superior. In addition, in some implementations, the power system may be adaptable with respect to the training of the robotic apparatus 500. The robotic may improve its efficiency (to include power consumption efficiency) through learned management techniques specifically tailored to the tasks performed by the robotic apparatus.

Methodology described herein may be utilized in home automation applications. FIG. 12 illustrated a system configured to enable automation of home entertainment appliance in accordance with one or more implementations. The system 1200 may comprise a television (TV) set 1216 operable via a remote controller handset 1204 configured to transmit one or more commands 1202 to, e.g., change channels of the TV 1216. The system 1200 may comprise a learning apparatus 1210 configured to determine an association between sensory context and the one or more commands 1202. In some implementations, the apparatus may comprise a camera configured to provide sensory input related to environment within the room containing the audio-video appliance (e.g., TV, DVD, DVR 1216). In one or more implementations, such as illustrated in FIG. 12, the context may be determined based on sensory input provided to the apparatus 1210 by an external camera, e.g., the camera 1220 mounted on the TV set 1216 and/or remote camera 1212. The video data may be communicated from the camera 1220 via remote link 1214 and/or the camera 1212 via the link 1208. The link 1202 and/or 1212 may comprise any applicable remote communication technologies, such as, for example Wi-Fi, Bluetooth, ZigBee, cellular data, and/or other links.

The context information may comprise any information that may be reliably associated with the remote control actions by the user. In some implementations, the context may comprise number, position and/or posture of users. By way of an illustration, a single user watching a movie may elect to suspend (pause) the playback in order to get a drink and/or attend to an issue outside the room. Pause command issued by the user via the handset 1204 may correspond to the following context data: a single user getting up.

In some implementations, the context may comprise information related to weather, time of day, day of the week and/or year, number of people in the room, identity of a person (e.g., a male adult vs. a child), content being displayed, and/or other information. A given context may be associated with a respective control command(s) by the apparatus 1210. For example, a male user may issue commands 1202 to switch the TV to a sports channel while a child may issue commands 1202 to switch the TV to a cartoon channel. In some implementations of multi-screen video projection devices (e.g., virtual and/or physical multi-screen TV, tablets, and/or computer monitors), users may configure content for individual screens depending on time of day, day of week, weather, and or other. In some implementations, the content may be configured based on presence and/or absence of one or more objects in a room (e.g., presence of a toy (e.g., from a Toy Story cartoon) character in the room may cause selection of a Disney channel and/or related TV channel.

In some implementations, the context may comprise user uses gestures that may be provided via Microsoft Kinect and/or other visual motion and position detection system. In one or more implementations, a user may utilize language commands that may be converted into some representation (e.g., a hash, a voiceprint), and used as a context. Individual words of language commands (spoken language tags) may have a meaning associated therewith, and/or may be meaningless (in a given language) provided the spoken language tags consistently accompany a given action by the robotic device.

In some implementations, the uses voice commands may be combined with user actions via a remote control (e.g., in FIG. 12) in order to provide context for association development. By way of an illustration, a user may say "gromche" and press TV remote "VOLUME UP" button; a user may say "tishe" and press TV remote VOLUME DOWN button. Upon developing the associations, the user may utilize voice commands (e.g., 'gromche', tishe', and/or other voice commands that may or may not have a meaning in English) in order to control the TV 1220 without the remote controller.

Learning of associations between the commands 1202 and the context may be attained using any applicable methodologies described herein, including, e.g., the adaptive predictor framework described with respect to FIGS. 4, 14 above. Subsequent to learning the associations, upon detecting occurrence of a given context, the apparatus 1210 may issue remote control commands 1206 to the audio video apparatus 1216 that may be associated with the given context. For example, upon detecting that the user stood up (using sensory input from the camera 1208 and/or 1220) the apparatus 1210 may issue commands to the apparatus 1216 to pause content playback; upon detecting an adult user in the room at 6 pm during a week day the apparatus 1210 may issue commands to display one or more news stations on one or more screens of the apparatus 1210; upon detecting a change in weather (using e.g., wired and/or wireless sensor component 1226) the apparatus 1210 may issue commands to the apparatus 1210 display one or more weather station feeds. It will be recognized by those skilled in the arts that the learning controller 1210 may be employed to learn to operate other home appliances, such as, e.g., HVAC system, fan, heater, humidifier, sound system, security system, and/or other.

Methodology of associating context with remote control commands of a robot described herein may be used to enable an arbitrary remote controller to operate a given robotic device. FIG. 13 illustrates a system 1300 comprising a learning remote controller apparatus 1310 for controlling a robotic device 1320. The apparatus 1310 may be embodied with a robotic device, e.g., as illustrated by the apparatus 1510 of a vehicle 1500 shown FIG. 15. FIG. 15 illustrates a robotic device (e.g., remotely operated vehicle 1500) comprising a learning controller 1510 of the disclosure. In some implementations, the controller 1510 may be disposed in a battery form factor so as to fit in a battery compartment of the vehicle 1500. A variety of battery form factors may be utilized including, e.g., standard batteries AAA, AA, A, C, CC, D, 18XXX series (e.g., 18500, 18560, 18350 and/or other), 12V gel-cell. Custom battery assemblies (e.g., Rustler VXL 9.6V, Traxxas 7.4V, and/or other) may also be used wherein a portion of battery electrolyte volume may be replaced by mechanical and electronic components of the learning controller.

The robotic device 1320 may comprise the vehicle 1500 shown in FIG. 15 and be operated based on one or more commands. In some implementations the robotic apparatus 1320 may be operable by an internal controller issuing one or more commands. The commands may cause the device 1320 to perform an action in accordance with a target trajectory (e.g., a navigate a figure-8 trajectory shown and described with respect to FIGS. 16A-16D, below). The commands may be issued by the controller in accordance with a pre-defined sequence (e.g., a program). In some implementations of dictionary training, the commands may comprise repertoire of all commands that may be executed by the device 1320. By way of an illustration, the following commands may be executed by the device 1320 with 2 controllable degrees of freedom: MOVE FORWARD, TURN RIGHT, TURN RIGHT, MOVE FORWARD, STOP, MOVE BACKWARD, TURN LEFT, TURN LEFT STOP, and/or other. The trajectory navigation by the device 1320 may be triggered by via a dedicated instruction from the user (e.g., demo, train), a button, and or other means (e.g., a timer).

A user may elect to operate the robotic device 1320 using an arbitrary (e.g., not specifically designed for the device 1320) remote control device. For example, a user may already own a third party remote control steering wheel that may be well suited for remotely operating vehicles but may not be compatible with the specific vehicle 1320 the user wishes to operate. The incompatibility between the steering wheel and the vehicle may arise due to a variety of causes, e.g., transmission mechanism (e.g., RF vs IR), transmission code, protocol, and/or other causes. The association learning methodology described herein may enable users to train the learning controller 1310 to operate the specific vehicle of the user using the steering wheel remote controller.

Figure 16A:
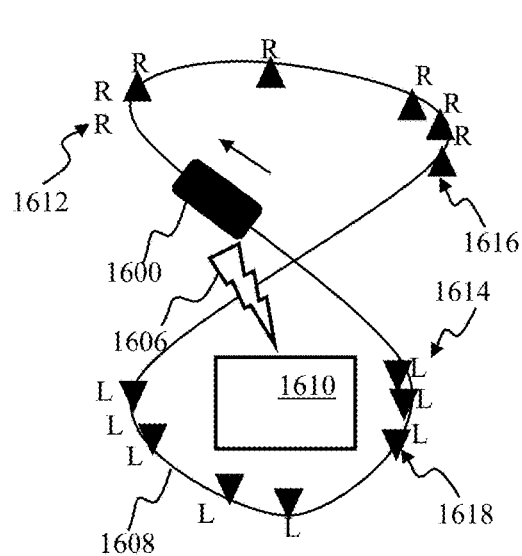
FIG. 16A is a graphical illustration depicting a trajectory of a robotic vehicle useful with learning of command associations by a learning apparatus external to the vehicle, according to one or more implementations.
Figure 16B:
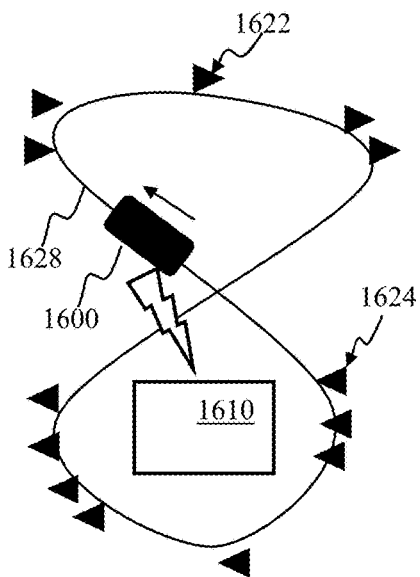
FIG. 16B is a graphical illustration depicting a trajectory of a robotic vehicle obtained using learned associations of, e.g., FIG. 16A, according to one or more implementations.
Figure 16C:
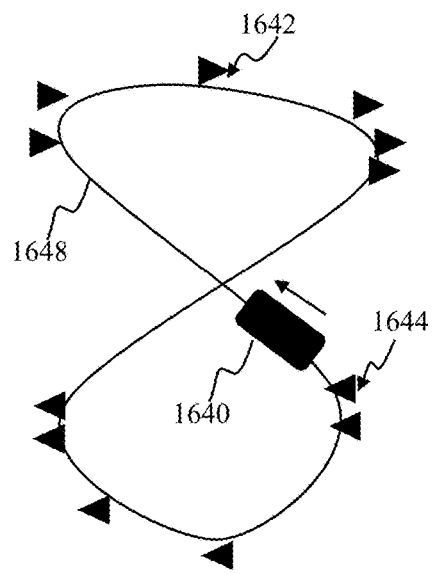
FIG. 16C is a graphical illustration depicting a trajectory of a robotic vehicle useful with learning of command associations by a learning apparatus embodied within the vehicle, according to one or more implementations

The learning process may comprise the following operations illustrated in FIGS. 16A-16C. In FIG. 16A, robotic device 1600 (e.g., a rover 1500 in FIG. 15, and/or the device 1320 in FIG. 13) may navigate a figure-8 trajectory 1608 in a direction depicted by arrow 1606 based on commands issued via link 1606 by the controller 1610 of the device 1600. In some implementations, wherein the controller 1610 may be disposed external from the robotic device 1600, the link 1606 may comprise a remote link (e.g., RF, IR, and/or other links). In one or more implementations, wherein the controller 1610 may be integrated with the robotic device (e.g., the device 1640 of FIG. 16C and/or 1500 of FIG. 15), the link 1606 may comprise a local wired and/or wireless link (e.g., serial). The controller 1610 may issue commands in accordance with a pre-defined sequence (e.g., a program). The controller 1610 commands to the device 1600 may correspond to the commands 1312 provided by the controller 1310 to the device 1320 of FIG. 13. Individual commands are illustrated in FIG. 16A by symbols 'R' (e.g., 1612) and 'L' (e.g., 1614) corresponding to TURN RIGHT, TURN LEFT actions by the device 1600, respectively.

The user may utilize a remote control device (e.g., a steering wheel remote) to transmit indications that may match the robot navigation actions. Individual remote indications by the user are illustrated in FIG. 16A by symbols '▶' 1616 and '◀' 1618, corresponding to TURN RIGHT, TURN LEFT actions by the device 1600, respectively.

Returning now to FIG. 13, the apparatus 1310 may receive via pathway 1304 user remote commands (e.g., the indications 1616, 1618 in FIG. 16A). In one or more implementations wherein the user indications are transmitted by an IR transmitter, the apparatus 1310 may comprise an IR receiver configured to detect the user indication transmissions, e.g. as described above with respect to FIGS. 1A, 1C. In some implementations, the user indications 1304 in FIG. 13 and/or 1616, 1618 in FIG. 16A may comprise gestures (e.g., provided via a Microsoft Kinect or other visual system), audible signals (e.g., voice, claps, clicks, whistles) and/or other communication means. It is noteworthy that the user remote indications 1304 may not alone be sufficient to cause the robotic device to perform an action. Rather, these indications may serve as a label (tag) associated with a given action by the robotic device 1320.

The apparatus 1310 may receive sensory input related to actions being executed by the device 1320 responsive to the commands 1320 (e.g., turns along the trajectory 1608 responsive to commands 1612, 1614 in FIG. 16A). The sensory input may comprise input 102 of FIG. 1A and/or 1132 of FIG. 11A, described above.

The apparatus 1310 may operate a learning process configured to develop associations between the device control commands 1312 and the user control indications 1304. In one or more implementations the learning process may comprise a supervised learning process configured to operate an adaptive predictor, e.g. such as described above with respect to FIG. 4 and/or FIG. 14B discussed above. In some implementations wherein the apparatus 1310 may receive sensory input, the learning of associations may be aided by context that may be derived from the input. For example, video of the robot performing turns responsive to the commands 1312 may aid to signify to the learning process that a particular indication (e.g., TURN RIGHT '▶' 1616) is accompanied by a turn to the right and a TURN RIGHT control command 1312 'R'.

Using the developed associations between the user indications 1304 and the control commands 1312, the apparatus 1310 may produce, based on receiving an indication from the user, a control command associated with that indication. By way of an illustration shown in FIG. 16B, the apparatus 1310 (1610 in FIG. 16B) may issue TURN RIGHT, TURN LEFT commands corresponding to receipt of the user indications '▶' 1622 and/or '◀' (e.g., 1624) in FIG. 16B.

Accordingly, issuance of indications by the user using the steering wheel remote may cause the device 1600 to follow the trajectory 1628 in FIG. 16B.

In some implementations, the learning apparatus (e.g., 1310 of FIG. 13) may be disposed within the robotic device 1640 of FIG. 16C. Issuance of indications by the user using a remote control may cause the device 1640 to follow the trajectory 1648 in FIG. 16C due to commands issued by the integrated controller.

FIGS. 6-9 illustrate methods of training and operating a learning controller apparatus of the disclosure in accordance with one or more implementations. The operations of methods 600, 700, 800, 820, 840, 900 presented below are intended to be illustrative. In some implementations, methods 600, 700, 800, 820, 840, 900 may be accomplished with one or more additional operations not described, and/or without one or more of the operations discussed. Additionally, the order in which the operations of methods 600, 700, 800, 820, 840, 900 are illustrated in FIGS. 6-9 described below is not intended to be limiting.

In some implementations, methods 600, 700, 800, 820, 840, 900 may be implemented in one or more processing devices (e.g., a digital processor, an analog processor, a digital circuit designed to process information, an analog circuit designed to process information, a state machine, and/or other mechanisms for electronically processing information and/or execute computer program modules). The one or more processing devices may include one or more devices executing some or all of the operations of methods 600, 700, 800, 820, 840, 900 in response to instructions stored electronically on an electronic storage medium. The one or more processing devices may include one or more devices configured through hardware, firmware, and/or software to be specifically designed for execution of one or more of the operations of methods 600, 700, 800, 820, 840, 900. The operations of methods 600, 700, 800, 820, 840, 900 may be implemented by a learning controller apparatus (e.g., 110 in FIG. 1A) configured to control a robotic device (e.g., 104 in FIG. 1A).

Figure 6:
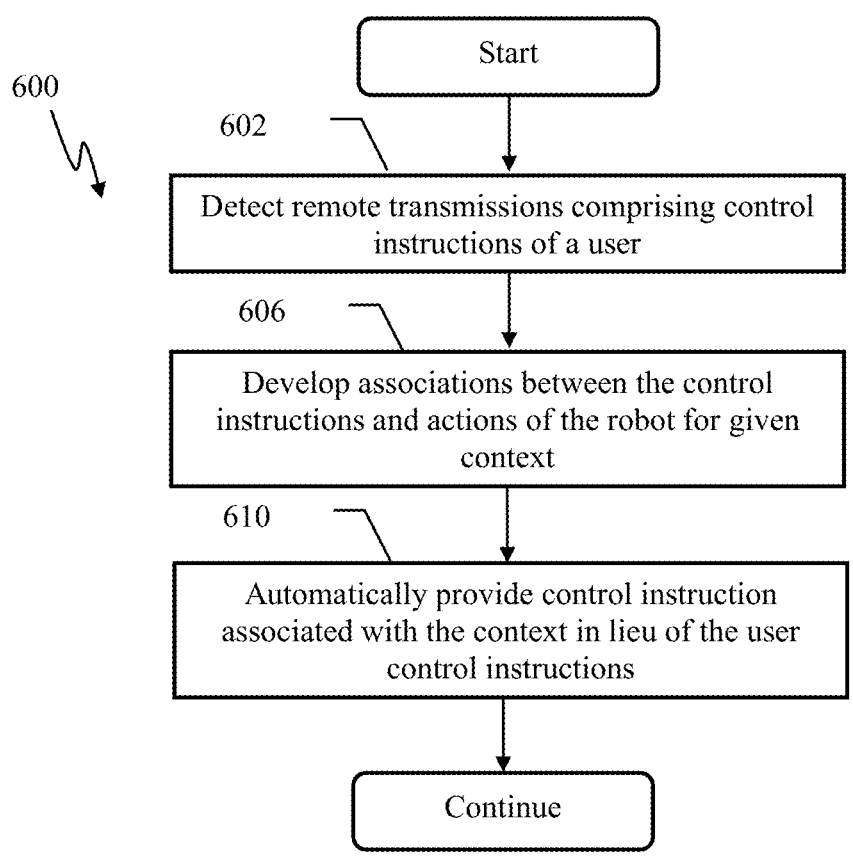
FIG. 6 is a logical flow diagram illustrating a generalized method of operating a learning remote controller apparatus of a robot, in accordance with one or more implementations.

At operation 602 of method 600, illustrated in FIG. 6 remote transmissions comprising control instructions of a user may be detected. In one or more implementations, the transmissions may comprise infrared light wave and/or radio wave pulses produced by a user remote control handset (e.g., 102, 152, 202 in FIGS. 1A-1B, 2, respectively). The control instructions may comprise one or more commands to the robotic device to perform one or more actions (e.g., turn right).

At operation 604 associations may be developed between the control instructions determined at operation 602 and the corresponding actions of the robot for given context. The robot actions may comprise one or more of robot state modifications (e.g., robotic car orientation, speed changes, manipulator joint position, orientation, zoom, and/or focus parameters of a camera, and/or other).

In some implementations, the context may comprise on or more aspects of sensory input (e.g., 406) and/or feedback (416 in FIG. 4) and/or input provided by the sensor 112 in FIG. 1A and/or 166 in FIG. 1C. The sensory aspects may include an object being detected in the input, a location of the object, an object characteristic (color/shape), characteristic of robot's movements (e.g., speed along the trajectory portion 304 in FIG. 3), a characteristic of an environment (e.g., an apparent motion of a wall and/or other surroundings, turning a turn, approach, and/or other environmental characteristics) responsive to the movement.

At operation 606 control instruction associated with the context may be automatically provided to the robotic device in lieu of the user control instructions associated with the operation 602. In some implementations, wherein protocol specification of the control communication between a user remote control handset and the robotic device may be unavailable to the learning controller, provision of control instructions of operation 606 may be configured using a playback of transmission portions determined from the remote transmissions detected at operation 602. In some implementations, wherein protocol specification of the control communication between the handset and the robotic device may be available to the learning controller, individual command transmissions associated with the control instruction provision of operation 606 may be configured using the protocol specification (e.g., command pulse code). In some implementations of obstacle avoidance, the context may comprise a representation of an obstacle (e.g., 308 in FIG. 3) in path of the robot. The control instruction may instruct the robot to execute right turn.

In some implementations, the association development and the automatic provision of the control instructions by the learning controller may be configured based on one or more training trials wherein a user may control the robot to perform a given task during several trials (e.g., between 2 and 100 trials). Various training methodologies may be employed including these, e.g., described in U.S. patent application Ser. No. 13/842,583 entitled "APPARATUS AND METHODS FOR TRAINING OF ROBOTIC DEVICES", filed Mar. 15, 2013, incorporated supra. In accordance with the training methodologies described in the Application '583 referenced above, during initial trials (e.g., 2-10 trials in some implementations) the control of the robot may be effectuated based on the control input from the user (e.g., the commands within the transmissions 106 in FIG. 1A). In some implementations, such configuration may be based on the combiner (e.g., 414 transfer function h assigning a near-zero weight to the predicted control signal 418 in FIG. 4. During training, upon attaining a target level of confidence, the learning controller may begin to provide control input to the robot in lieu of the user control input). In some implementations, the target level of confidence may be determined based on the level of plasticity (change of parameters) in the predictor module or the prediction error between the signal received from the user and the signal generated by the predictor, or other means ensuring that the response of the predictor converges to the commands sent by the user, evaluation of the recent value versus a running average of the correlation between the user control input signals and/or the learning controller's predictor outputs. Automatic provision of the control input by the learning controller may be based on the combiner (e.g., 414 in FIG. 4) transfer function h assigning a reduced weight to the input 408 compared to the predicted control signal 418 in FIG. 4.

Figure 7:
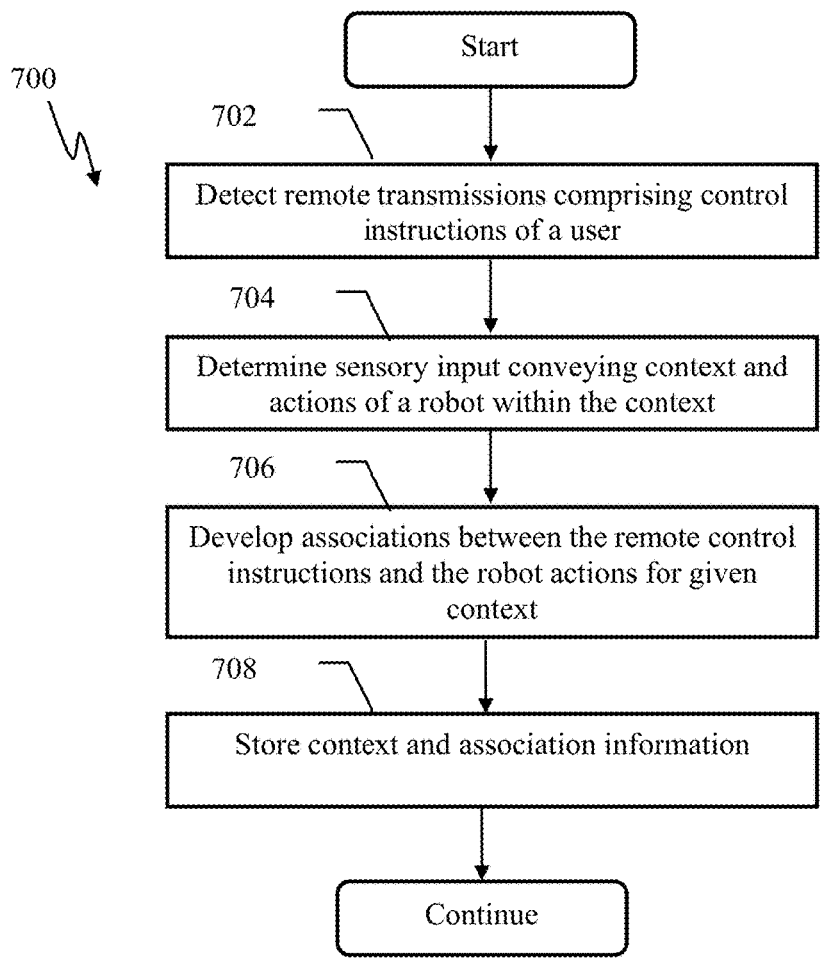
FIG. 7 is a logical flow diagram illustrating a method of determining an association between user control instructions and sensory associated with action execution by a robot, in accordance with one or more implementations.

FIG. 7 illustrates a method of determining an association between user control instructions and sensory associated with action execution by a robot, in accordance with one or more implementations.

At operation 702 of method 700, illustrated in FIG. 7 remote transmissions comprising control instructions of a user may be detected. In one or more implementations, the transmissions may comprise infrared light wave and/or radio wave pulses produced by a user remote control handset (e.g., 102, 152, 202 in FIGS. 1A-1B, 2, respectively). The control instructions may comprise one or more commands to the robotic device to perform one or more actions (e.g., turn right).

At operation 704 sensory input conveying context and actions of a robot within the context may be determined. In one or more implementations, such as object recognition, and/or obstacle avoidance, the sensory input may be provided by a sensor module of the learning controller (e.g., 112 in FIG. 1A) and may comprise a stream of pixel values associated with one or more digital images. In one or more implementations of e.g., video, radar, sonography, x-ray, magnetic resonance imaging, and/or other types of sensing, the input may comprise electromagnetic waves (e.g., visible light, IR, UV, and/or other types of electromagnetic waves) entering an imaging sensor array. In some implementations, the imaging sensor array may comprise one or more of RGCs, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure. In one or more implementations, the sensory aspects may include an object being detected in the input, a location of the object, an object characteristic (color/shape), characteristic of robot's movements (e.g., speed along the trajectory portion 304 in FIG. 3), a characteristic of an environment (e.g., an apparent motion of a wall and/or other surroundings, turning a turn, approach, and/or other environmental characteristics) responsive to the movement.

At operation 706 associations may be developed between the control instructions determined at operation 602 and the corresponding actions of the robot for given context. The robot actions may comprise one or more of robot state modifications (e.g., robotic car orientation, speed changes, manipulator joint position, orientation, zoom, and/or focus parameters of a camera, and/or other). In one or more implementations, the associations may be configured based on one or more LUT characterizing the relationship between sensory input (e.g., distance to obstacle d) and control signal (e.g., turn angle $\alpha$ relative to current course) obtained by the learning controller during training.

At operation 708 the association information may be stored. In some implementations, the information storing of operation 708 may comprise storing one or more entries of a LUT (e.g., as shown in Table 1-2) in internal memory of the learning controller apparatus (e.g., the memory 514 in FIG. 5). In one or more implementations, the associations may be stored off-device in, e.g., a computer cloud depository 1006 of FIG. 10.

Figure 8A:
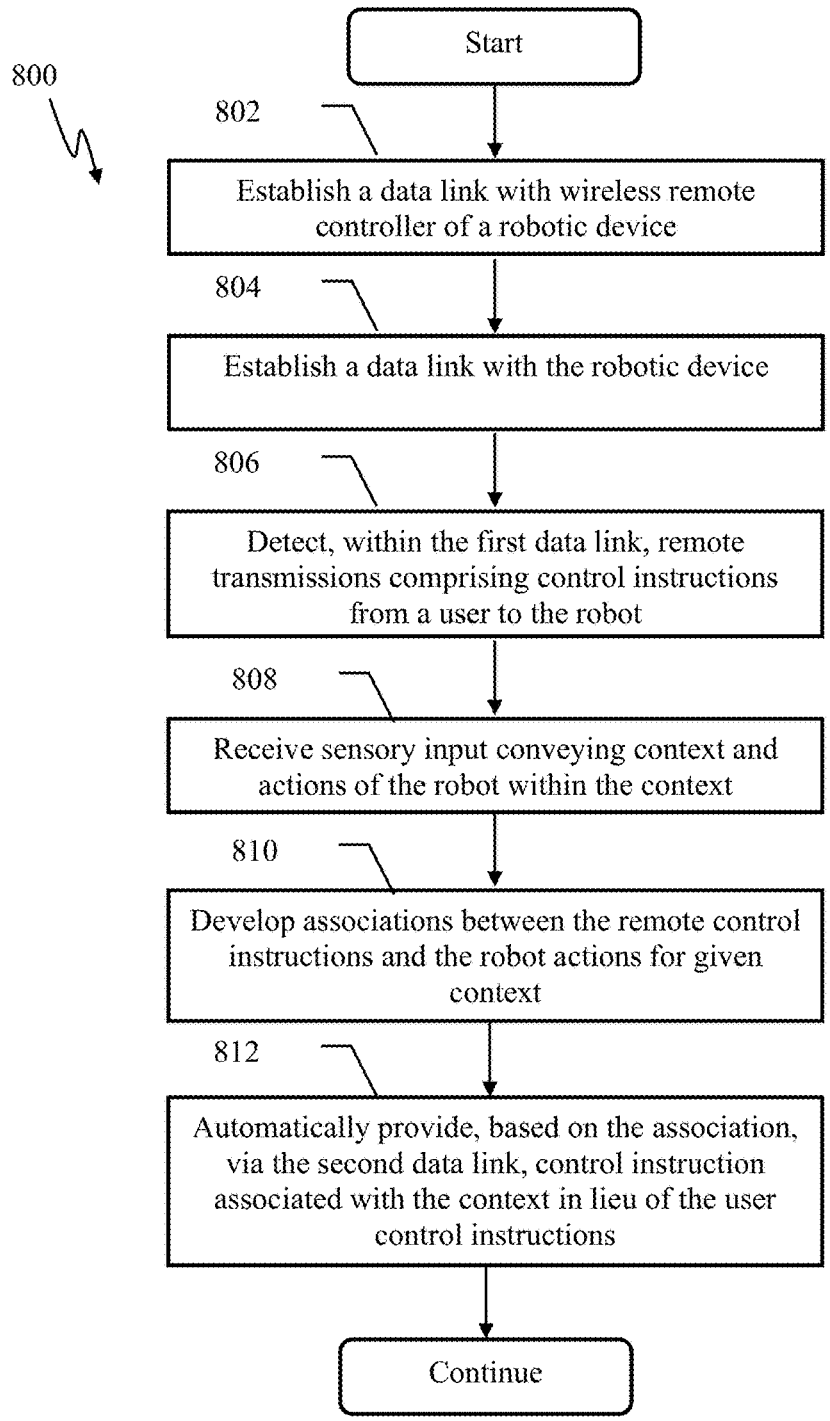
FIG. 8A is a logical flow diagram illustrating provision of control commands, in lieu of user input, to a robot by a learning remote controller apparatus a method of training an adaptive robotic apparatus, in accordance with one or more implementations.

FIG. 8A illustrates provision of control commands, in lieu of user input, to a robot by a learning remote controller apparatus a method of training an adaptive robotic apparatus, in accordance with one or more implementations. Operations of method 800 of FIG. 8A may be employed by the learning control apparatus 210 of the system 200 shown in FIG. 2A.

At operation 802 of method 800, illustrated in FIG. 8A a first data link between a wireless remote controller of a robotic device may be established. In some implementations, the wireless remote controller may comprise a user handset device 202 of FIG. 2A and the data link establishment may be based on a pairing between the learning controller and the handset.

At operation 804 a second data link with the robotic device may be established. In some implementations, the second link establishment may be based on a pairing between the learning controller and the robot (e.g., 224 in FIG. 2A).

At operation 806 remote transmissions comprising control instructions from a user to the robot may be determined in the first data link. In one or more implementations, the control instruction determination may be based on determining a pulse pattern within the first data link signal.

At operation 808 sensory input may be received. The sensory input may convey a context (e.g., position, and/or motion characteristics of a robot and/or an obstacle illustrated in panel 300 in FIG. 3). The context may comprise actions of the robot (e.g., the turn 306 associated with the context (the obstacle 308 relative trajectory 304 of the robot 302 in FIG. 3).

At operation 810 associations between the remote control instructions and the robot actions for given context may be developed. In one or more implementations, the associations may be configured based on one or more LUT characterizing the relationship between sensory input (e.g., distance to obstacle d) and control signal (e.g., turn angle α relative to current course) obtained by the learning controller during training. In one or more implementations, the associations may comprise a trained configuration of a network of artificial neurons configured to implement an adaptive predictor and/or combiner of the control system described above with respect to FIG. 4. During training, efficacy of connections between individual nodes of the network may be modified in order to produce the predicted control signal (e.g., 418) that matches the user control signal (e.g., 408 in FIG. 4).

At operation 812 control instruction associated with the context may be automatically provided via the second data link, in lieu of the user control commands. The instruction provision of operation 812 may be configured based on the association information determined at operation 810.

Figure 8B:
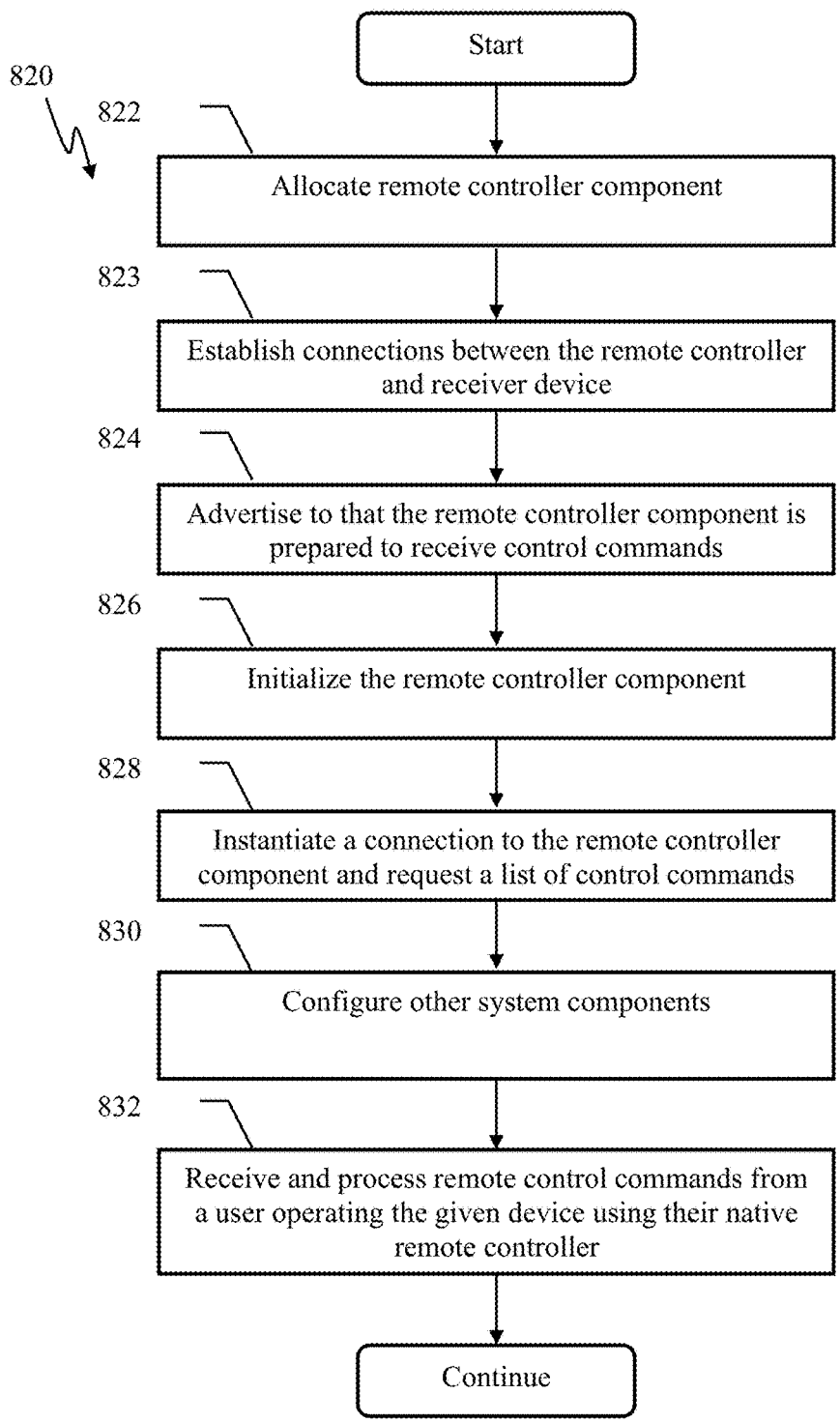
FIG. 8B is a logical flow diagram illustrating operation of a control system comprising a learning remote controller apparatus for controlling a robotic device, in accordance with one or more implementations.

FIG. 8B illustrates operation of a control system of, e.g., FIG. 14B, comprising a learning remote controller apparatus for controlling a robotic device, in accordance with one or more implementations At operation 822 of method 820, a remote control object (the component 1478 in FIG. 14B) may be allocated. In some implementations, the remote control object component allocation may comprise allocating memory, initializing memory pointers, loading hardware drivers, and or other operations. The remote control object component may serve as Environment (e.g., robot motors/sensors) and adapter for BrainOS (e.g., the component 1460 in FIG. 14B).

At operation 823 the remote control object may establish connections to a receiver (e.g., device 1474 in FIG. 14B). In some implementations, the receiver device may comprise a micro-controller and an IR detector.

At operation 824 the remote control object may advertise to the BrainOS that it is prepared to receive control commands. In some implementations of remotely control rover navigation (e.g., the commands may comprise FORWARD, BACKWARDS, LEFT, and RIGHT commands).

At operation 826 the remote control object may be initialized. In some implementations, the remote control object initialization may be based on a programmatic operation comprising, e.g., an execution of a user script configured to provide detail related to robot communication protocol (e.g., IR codes for output 1493). In some implementations, the remote control object initialization may be configured based on an auto-detect operation wherein the remote control object may listens for an IR code and select the robotic communications protocol (from a list of protocols) based on a closest match. In some implementations, the remote control object initialization may be based on learning wherein the user may provide one or more commands to the robot (e.g., forward, backward, left, and right) so as to builds a protocol library entry (e.g., dictionary learning).

At operation 828 BrainOS may instantiate a connection to the remote control object (e.g., comprising the connection 1479 in FIG. 14B). The BrainOS component may request specification of robot command interface that may be applicable to control of a given robot. In some implementations, the robot command interface specification may comprise number of control channels (e.g., number of unique command codes from robot remote controller, type of command, e.g., analog, binary, and/or other parameters. The connection between the remote control object and the BrainOS components may be configured in accordance with the robot command interface (e.g., by establishing bus bit width for the connection 1479 of FIG. 14B).

At operation 830 BrainOS may configure a predictor (e.g., 1484 in FIG. 14B) of the appropriate dimension for controlling a target device (e.g., 1494 in FIG. 14B) and a combiner (e.g., 1490 in FIG. 14B). In some implementations, the predictor may comprise a linear perceptron, with or without soft maximum limiter depending on the configuration. The combiner may comprise an additive or an override implementation. BrainOS component may initialize one or more Feature Extractors (FEs) depending on the identified robot, expected task, user script, or other signals. For example, appropriate FEs to select may be indicated based on gyro and/or accelerometers measurements. Inertial measurement may signal movement and be associated with obstacle avoidance FEs; non-movement may cause instantiation of temporal difference FEs, motion detecting FEs, and/or other configurations.

At operation 832 the system may receive and process remote control commands caused by a user operating the given device using their native remote controller. In some implementations, command processing operations may comprise method 840 described below with respect to FIG. 8C.

Figure 8C:
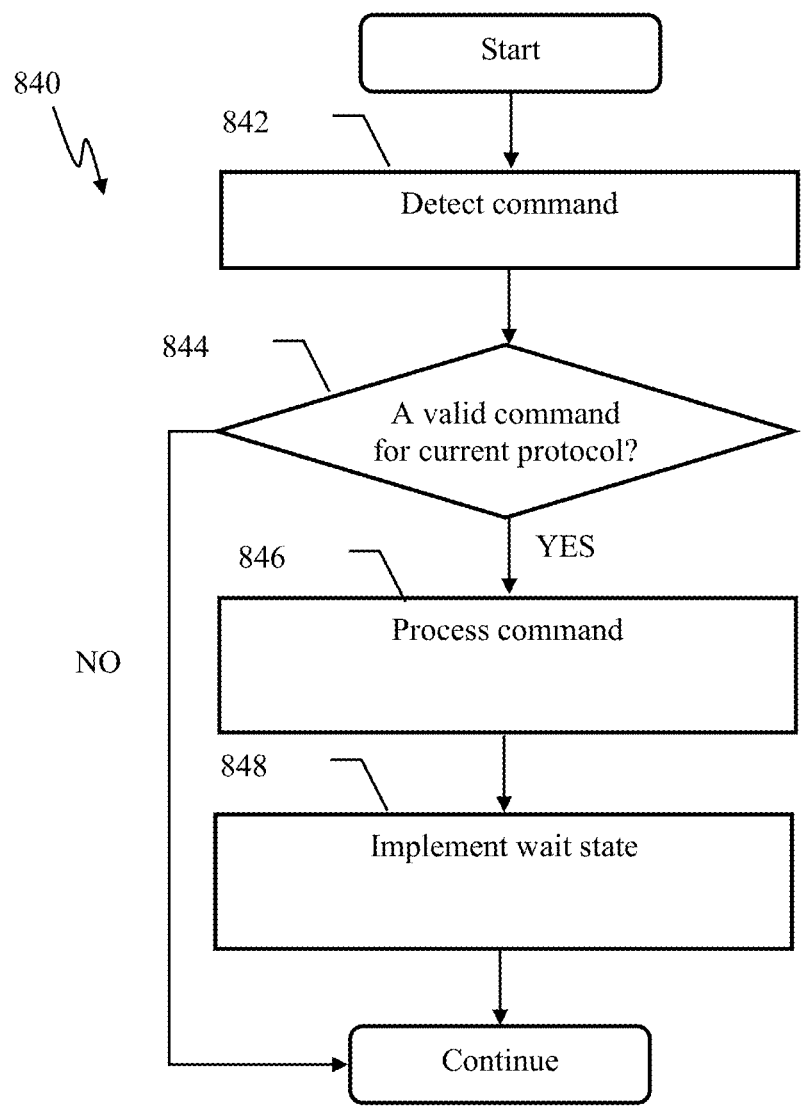
FIG. 8C is a logical flow diagram illustrating processing of control commands by a learning controller apparatus, in accordance with one or more implementations.

FIG. 8C illustrates a method of processing of control commands by the learning remote controller apparatus, in accordance with one or more implementations.

At operation 842 a command may be detected. In some implementations, the command may comprise an RF or IR transmission from a remote control handset (e.g., the handset 1472 in FIG. 14B) during user operation of a robotic device (e.g., the device 1494 in FIG. 14B)).

At operation 844 a determination may be made as to whether the command identified at operation 842 comprises a valid command. In some implementations, the command validation may be based on a comparison of the command code to entries of the bi-directional LUT described above with respect to FIG. 14B. For example, a similarity score (e.g., normalized dot product) may be computed between the pulse sequence duration vectors constituting the command and the entries of the table. When the similarity score is found to breach a threshold, e.g., exceed 0.95 than the command is considered to be valid and to correspond to the robot protocol for which this match occurred. In one implementation the threshold of 0.95 need not be fixed a priori by the developer, but may be computed autonomously with the assumption that the similarity within a single robot's protocol significantly exceeds the similarity between robots protocols. Thus this automated thresholding mechanism takes as its threshold the maximum of all computed similarities between the entries that correspond to pairs of robots. In some implementations, a test for the violation of this assumption may be automated: When the computed similarities within entries corresponding to a robot's protocol may be lower than that of the similarities between robot protocols, the assumption allowing for an automatically-computed threshold for assessing valid commands may likely to be violated given the database of robot protocols and this particular method.

Responsive to determination at operation 844 that the received command comprises a valid command, the method 840 may proceed to operation 846 wherein the command may be processed. The command processing operations may comprise: suspension of transmissions by the controller apparatus (e.g., the transmitter component 1492) so as not to interfere with the user command transmissions to the robotic device, effectively implementing Override Combiner. The learning remote controller apparatus may interpret presence of a given command (e.g., command forward in Table 3) as a +1 teaching signal provided via the corrector component (1486) to the predictor 1484 by finding the closest match (normalized dot product) to the current protocol library. The learning remote controller apparatus may be configured to provide −1 teaching signals to remaining control channels indicating that the corresponding outputs should not be activated for the present context. In some implementations, the learning remote controller apparatus may be configured to ignore user command(s) that do not belong to the loaded robot protocol.

At operation 848 the learning remote controller apparatus may be configured to implement a wait state wherein the component may waits for a timeout period after last user command signal is sent before resuming control operations.

Figure 9:
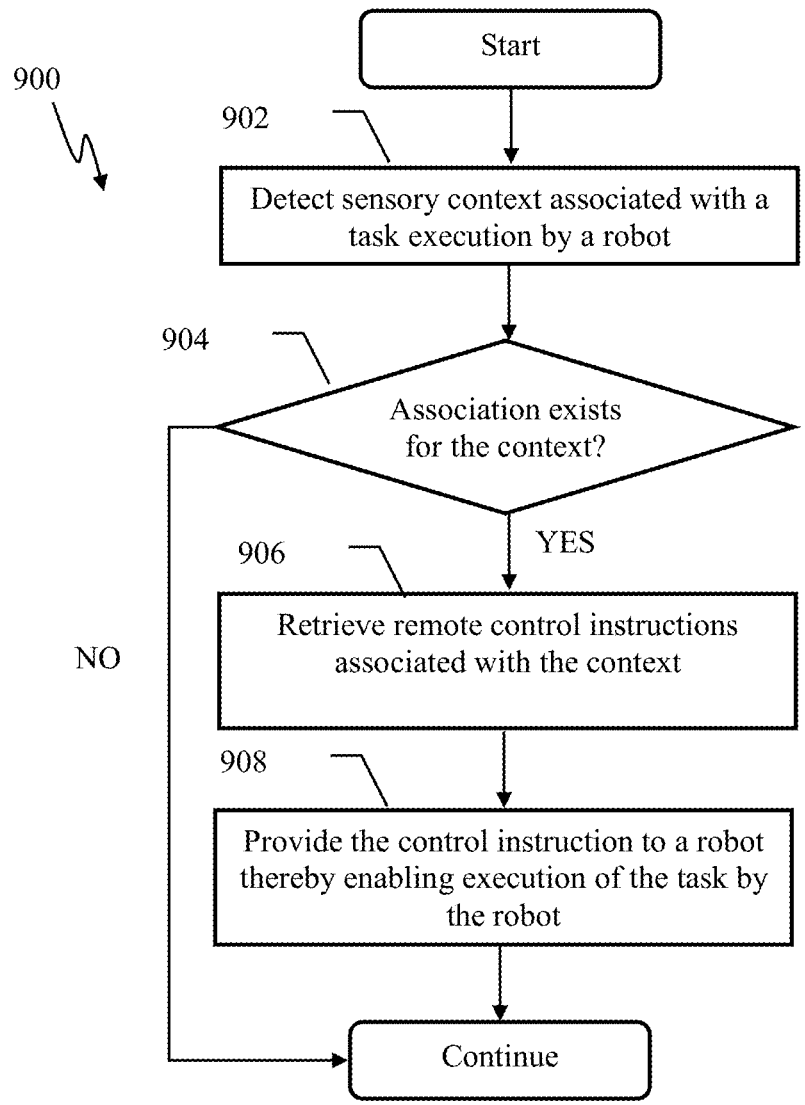
FIG. 9 is a logical flow diagram illustrating provision of control instructions to a robot by a learning remote controller apparatus based on previously learned associations between context and actions, in accordance with one or more implementations.

FIG. 9 illustrates provision of control instructions to a robot by a learning remote controller apparatus based on previously learned associations between context and actions, in accordance with one or more implementations.

At operation 902 of method 900 sensory context associated with a task execution by a robot may be determined. The context determination may be based on analysis of sensory input. In one or more implementations the sensory input may be provided by a sensor module of the learning controller (e.g., 112 in FIG. 1A) and may comprise a stream of pixel values associated with one or more digital images. In one or more implementations of e.g., video, radar, sonography, x-ray, magnetic resonance imaging, and/or other types of sensing, the input may comprise electromagnetic waves (e.g., visible light, IR, UV, and/or other types of electromagnetic waves) entering an imaging sensor array. In some implementations, the imaging sensor array may comprise one or more of artificial RGCs, a CCD, an APS, and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure. In one or more implementations, the sensory aspects may include an object being detected in the input, a location of the object, an object characteristic (color/shape), characteristic of robot's movements (e.g., speed along the trajectory portion 304 in FIG. 3), a characteristic of an environment (e.g., an apparent motion of a wall and/or other surroundings, turning a turn, approach, and/or other environmental characteristics) responsive to the movement.

At operation 904 a determination may be made as to whether the context determined at operation 902 has previously occurred and an association exists for the context. The association may comprise a relationship between the context and one or more user commands configured to cause the robot to perform an action for the context. In one or more implementations, determination as to whether the association exists may be based on an analysis of a LUT configured to store associations between the context and the user control input.

Responsive to determination that the association exists, the method 900 may proceed to operation 906 wherein remote control instructions associated with the context may be retrieved. In some implementations, wherein protocol specification of the control communication between the user handset (e.g., 152 in FIG. 1C) and the robotic device (e.g., 154 in FIG. 1C) may be available to the learning controller (e.g., 160 in FIG. 1C), the remote control instructions may be configured using the protocol specification (e.g., command pulse code). In some implementations, wherein protocol specification of the control communication between the handset and the robotic device may be unavailable to the learning controller, the remote control instructions may be configured using a playback of user command transmission portions associated with a given context and/or action by the robotic device (e.g., IR remote transmission to cause the robot to turn right).

At operation the control instruction determined at operation 906 may be provided to the robot thereby enabling execution of the task by the robot.

Figure 10:
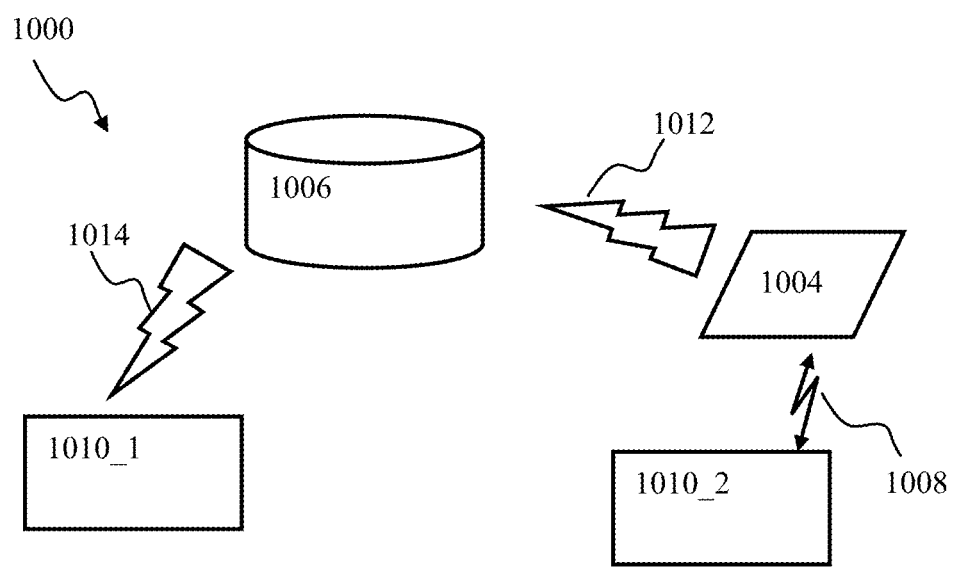
FIG. 10 is a functional block diagram illustrating a computerized system comprising the learning controller apparatuses of the present disclosure, in accordance with one implementation.

FIG. 10 illustrates a computerized system comprising a learning controller apparatus of the disclosure, in accordance with one implementation. The system 1000 may comprise a computerized entity 1006 configured to communicate with one or more learning controllers 1010 (e.g., 1010_1, 1010_2). In some implementations, the entity 1006 may comprise a computing cloud entity (e.g., a cloud service, a server, in a public, private or hybrid network). In one or more implementations, the entity may comprise a computer server, a desktop, and/or another computing platform that may be accessible to a user of the controller 1010. In some implementations of the cloud computing services, one or more learning controller apparatus 1010 may communicate with the entity 1006 in order to access computing resources (e.g., processing cycles and/or memory) in order to, e.g., detect features and/or objects in sensory data provided by, e.g., sensor module 112 of control system in FIG. 1A. In some implementations, the learning controller apparatus 1010 may communicate with the entity 1006 in order to save, load, and/or update, their processing configuration (e.g., robotic brain 512 in FIG. 5). The robotic brain images may comprise executable code (e.g., binary image files), bytecode, an array of weights for an artificial neuron network (ANN), and/or other computer formats. In some implementations, the learning controller apparatus 1010 may communicate with the entity 1006 in order to save, and/or retrieve learned associations between sensory context and actions of a robot, e.g., as described above with respect to FIGS. 7-9 above.

In FIG. 10, one or more learning controller apparatus (e.g., 1010_1) may connect to the entity 1006 via a remote link 1014, e.g., WiFi, and/or cellular data network. In some implementations, one or more learning controller apparatus (e.g., 1010_2) may connect to the entity 1006 via a local computerized interface device 1004 using a local link 1008. In one or more implementations, the local link 1008 may comprise a network (Ethernet), wireless link (e.g. Wi-Fi, Bluetooth, infrared, radio), serial bus link (USB, Firewire,) and/or other. The local computerized interface device 1004 may communicate with the cloud server entity 1006 via link 1012. In one or more implementations, links 1012 and/or 1014 may comprise an internet connection, and/or other network connection effectuated via any of the applicable wired and/or wireless technologies (e.g., Ethernet, Wi-Fi, LTE, CDMA, GSM, and/other).

In one or more applications that may require computational power in excess of that that may be provided by a processing module of the learning controller 1010_2 the local computerized interface device 1004 may be used to perform computations associated with training and/or operation of the robotic body coupled to the learning controller 1010_2. The local computerized interface device 1004 may comprise a variety of computing devices including, for example, a desktop PC, a laptop, a notebook, a tablet, a phablet, a smartphone (e.g., an iPhone®), a printed circuit board and/or a system on a chip (SOC) comprising one or more of general processor unit (GPU), field programmable gate array (FPGA), multi-core central processing unit (CPU), an application specific integrated circuit (ASIC), and/or other computational hardware.

FIGS. 17A-D illustrate exemplary control command codes for a plurality of selected remote controlled devices, according to one or more implementations. The data in FIGS. 17A-D represent duration in microseconds. In some implementations, the duration may correspond to duration between pulses used to encode data in using pulse position modulation methodology. In one or more implementations of pulse width modulation, the duration in FIGS. 17A-D may correspond to pulse duration. In some implementations, of infrared remote controllers, the codes shown in FIGS. 17A-D may be used with infrared carrier wave of wavelength at around 870 nm and/or selected between 930 nm and 950 nm. Modulation carrier may be selected between 33 kHz and 40 kHz and/or between 50 k and 60 kHz. In some implementations, one or more robotic devices may support a plurality of control channels" (channel a, channel b, shown in lines 44 and 52 of FIG. 17C). Such configuration may allow multiple of the same type of robot to be configured and controlled simultaneously. In some implementations, codes may be combined (e.g., using XOR operation).

Figure 18:
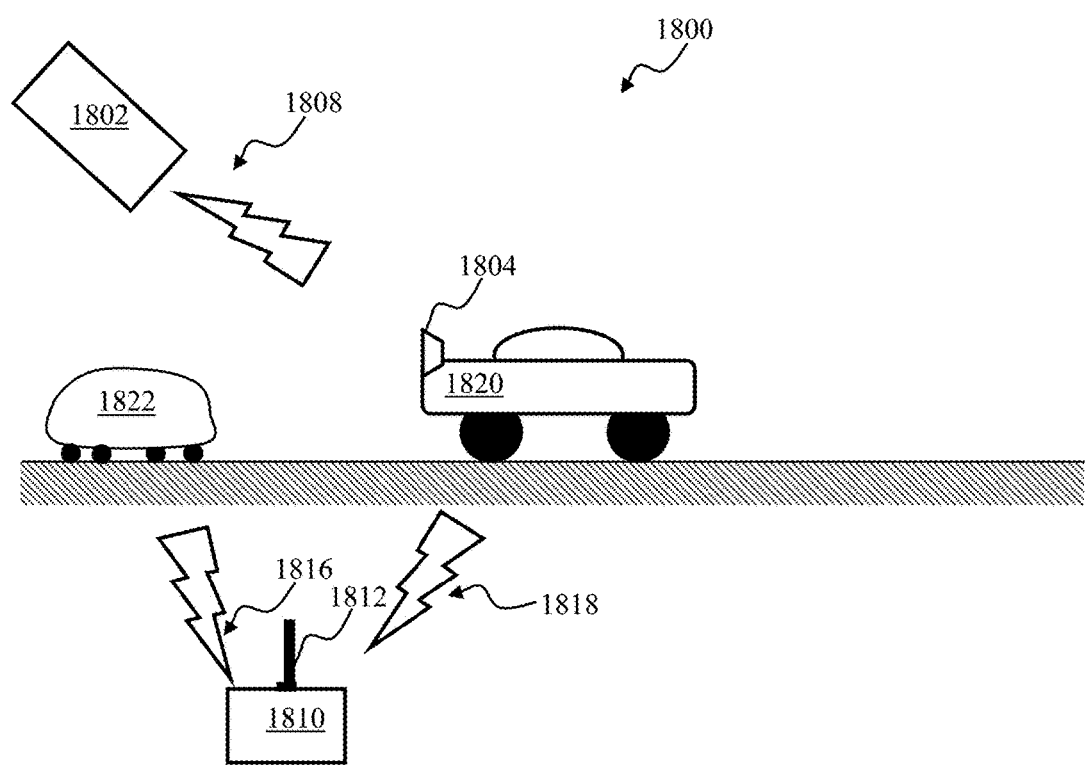
FIG. 18 is a block diagram illustrating a learning remote controller apparatus configured to control a plurality of robotic devices, in accordance with one or more implementations.

FIG. 18 illustrates a learning remote controller apparatus configured to control a plurality of robotic devices, in accordance with one or more implementations. The system 1800 shown in FIG. 18 may allow controlling two or more robotic devices simultaneously using the same learning controller device. In some implementations, two or more robotic devices may be physically or spatially coupled so they act as a single coordinated robot. For example two robots may be placed in the same room, the first of which has been trained to collect debris based on the sensory context of debris present on the ground, and upon completion of that task brings the debris to the second robot which elevates the debris and places it into into a trash receptacle second robotic device (e.g., a rover 1822, comprising for example a robotic bug). A user may train the controller 1810 to operate the bug 1822 using any of the applicable methodologies, e.g., such as described above with respect to FIGS. 1A-2C. During operation, the user may provide to the rover 1820 transmissions 1808 comprising one or more control instructions (e.g., pursue the bug 1822) using a remote control handset. The learning controller may determine a context associated with the robotic device 1822. In some implementations, the context may be determined based on sensory input obtained by a sensor module (not shown) of the controller 1810 and/or provided by a camera 1804 disposed on the rover 1820 to the controller via a remote link. Based on the previously determined associations between sensory context and user control commands for the device 1822 (available during training) during operation, the controller 1810 may provide remote control instructions to the device 1822 via link 1816 during operation. It is noteworthy that command provision by the controller 1810 to the device 1822 via the link 1816 may be performed in absence of user command transmission to the device 1822. In some implementations, the controller may be configured to learn to operate the robotic rover 1820 by developing associations between sensory context and the control instruction of the user (e.g., provided to the rover 1820 via the link 1808). During operation of the system 1800, the controller 1810 may provide, based on the previously determined associations, remote control instructions to the device 1820 via link 1818. The transmissions 1808, 1816, 1816 may be configured based on one or more IR, RF, ultrasound, visible light carrier waves.

In some implementations, the learning controller may enable operation of a robotic device configured for one wireless communications type (e.g., radio frequency based) using a remote controller handset that is configured for another wireless communications type (e.g., infrared).

The robotic devices 1820, 1822 may comprise portions of a robotic apparatus. In some implementations, (not shown) the robotic devices 1820, 1822 may be disposed proximate (and/or joined with) one another. By way of an illustration, the device 1820 may comprise a mobile vehicle base while the device 1822 may comprise a robotic arm mounted on the base. The user may train the controller 1810 by providing control instructions to the device 1820 and 1822 via the link 1808 in order to perform a task (e.g., approach and pick up an piece of refuse). Subsequent to training, the controller 1810 may capable of operation the device 1820, and 1822 a coordinated manner in order to perform the task.

In one or more implementations, the robotic devices 1820, 1822 may comprise portions of a robotic apparatus that may be disposed spatially remote from one another. By way of an illustration, in one such implementation, the device 1820 may comprise a mobile robotic loader, while the device 1822 may comprise a robotic bulldozer capable to be navigated independent from the loader. The user may train the controller 1810 by providing control instructions to the device 1820 and 1822 via the link 1808 in order to perform a task (e.g., approach and pick up an piece of refuse). Subsequent to training, the controller 1810 may capable of operation the device 1820, and/or 1822 in order to perform the task in a coordinated manner (e.g., push and load dirt). The methodology described herein may advantageously enable operation of robotic devices by a trained controller. The learning controller may provide control commands to the robot in lieu of user remote control actions. Use of a computerized controller for robot operation may enable performing of more complex tasks by the robot (e.g., tasks requiring dexterity and/or responsiveness that are beyond capability of a user), tasks that may require extreme concentration for extended periods of time e.g., in agriculture (harvesting, de-weeding,) security surveillance, and/or on manufacturing floor monitoring. Use of computerized controllers for robot operation may afford users with added functionality that may not have been available otherwise. By way of an illustration, a user may train the learning controller to control one robotic car to follow a trajectory (e.g., a race circuit) while controlling another robotic car in a multi-car race. Use of computerized controllers may enable operation of inhomogeneous robotic control systems, e.g., such as shown in FIG. 18. By way of an illustration, a user may train a learning controller to control an IR operated robotic device (e.g., a robotic bug) to move away from a predator (escape behavior); the user may use a RF DSM-based remote control to operate another mobile robot to follow the robotic bug in a chase game.

Learning controller of the disclosure (e.g., system 1470 of FIG. 14B may comprise a BrainOS component configured to enable robots to be teachable. A robot equipped with BrainOS may be trained to follow paths, react to its environment, approach target objects, and/or avoid obstacles. These behaviors may be chained together and/or organized hierarchically in order to create increasingly complex behaviors. Learning by BrainOS may be configured compatible with multiple robot bodies, whether newly built or obtained robot bodies. BrainOS may provide a non-invasive interface for connecting to multiple robot bodies. BrainOS may be employed on a wide variety of robots much more quickly that requiring the developer to solder wires to the new robot. Non-invasiveness may make BrainOS more attractive in a marketplace, allowing the delivery of a self-contained "spoofing remote control" device that may be placed on a table, shelf, or screwed into a light-bulb socket and used to control a variety of household devices.

In some implementation, a user may utilize an learning remote controller device and an existing remote controller (e.g., an IR universal TV remote) in order to train and/or operate an otherwise not controllable appliance (e.g., a Roomba® vacuum cleaner).

According to some implementations, the learning controller of the disclosure may operate one or more remotely controlled devices (e.g., 124 in FIG. 1B) in absence of user input, which is unlike other implementations where universal remote controllers may require pressing of remote control buttons in order to operate a device.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. A robotic system comprising:

a first robotic device;

a remote controller configured to provide a first wireless transmission that conveys a first control instruction from a user to the first robotic device, the first control instruction being configured to cause the first robotic device to execute a first action; and a learning controller apparatus configured to:

during a first time interval:

receive the first wireless transmission via a transceiver apparatus;

determine a first context associated with execution of the first action; and determine an association between data related to the first control instruction and the first context, the association determined by an adaptable predictor block; and during a second time interval, subsequent to the first time interval:

determine another version of the first context related to execution of the first action; and provide, via the transceiver apparatus and in lieu of the first control instruction, a first remote transmission that conveys the data related to the first control instruction based at least in part on the association determined by the adaptable predictor block, the data related to the first control instruction being configured to cause the first robotic device to execute the first action.

2. The system of claim 1, wherein:

the provision of the first remote transmission is configured to occur automatically and in absence of the first wireless transmission; and the execution of the first action by the first robotic device based on the first remote transmission is performed in an absence of an additional command instruction from the user.

3. The system of claim 1, wherein:

the data related to the first control instruction are determined based on the receipt of the first wireless transmission;

the first wireless transmission is transmitted on a first carrier wave;

the first control instruction comprises one or more pulses of the first carrier wave; and the data related to the first control instruction comprise the one or more pulses of the first carrier wave.

4. The system of claim 1, further comprising: a visual sensor component configured to provide the first context, the first context comprising information related to one or both of (i) a motion of the first robotic device during execution of the first action and (ii) a visual scene of an environment around the first robotic device.

5. The system of claim 1, wherein:

the first robotic device comprises a motion sensor configured to provide motion information related to one or both of (1) a motion of the first robotic device or (2) a motion of objects in an environment around the first robotic device; and the first context comprises the motion information.

6. The system of claim 1, further comprising a second robotic device;
wherein:
the learning controller apparatus is further configured to:
receive a second wireless transmission provided by the remote controller, where the second wireless transmission conveys a second control instruction from the user;
determine a second context associated with execution of a second action;
determine a second association between the second context and the second control instruction; and
based on the second association and occurrence of the second context, provide, in lieu of the second control instruction from the user, a second remote transmission that conveys data related to the second control instruction configured to cause the second robotic device to execute the second action.

7. The system of claim 6, wherein the second context comprises a position of the first robotic device relative the second robotic device.

8. The system of claim 1, wherein:
the execution of the first action is based on a plurality of operations having a plurality of control instructions associated therewith, the plurality of control instructions comprising the first control instruction;
the learning controller utilizes input from the user to effectuate the execution of the first action, the utilization being configured based on a first portion of the plurality of control instructions provided by the user; and
a second portion of the plurality of control instructions being provided by the learning controller instead of the user.

9. A learning apparatus for operation of a device, the apparatus comprising:
a receiver component;
a transmitter component;
an interface in communication with one or more sensors, the one or more sensors configured to determine context information of an environment surrounding the device;
one or more physical processor apparatus configured to execute computer program instructions to cause the one or more physical processor apparatus to:
(1) during a first plurality of training trials:
determine, via the receiver component, a control signal directed to the device, the control signal being provided by a user via a remote controller; and
store an association between the control signal provided by the user and the context information;
(2) during a training trial subsequent to the first plurality of training trials:
responsive to an observation of the context information via the one or more sensors, transmit the control signal to the device via the transmitter component, the control signal based at least in part on the stored association;
wherein the association is determined by logic configured to implement a learning process; and
wherein the learning apparatus is configured to be coupled to the device.

10. The apparatus of claim 9, wherein:
the remote controller comprises a wireless transmitter; and
the device comprises a remotely controlled apparatus.

11. The apparatus of claim 10, wherein the control signal transmission is configured to cause the remotely controlled apparatus to perform a task.

12. The apparatus of claim 11, wherein the device is configured to perform the task responsive to the control signal provided by the user via the remote controller.

13. The apparatus of claim 9, wherein:
the receiver component is configured to receive a carrier waveform; and
the transmitter component is configured to emit the carrier waveform;
the provision of the control signal by the user is effectuated responsive to a receipt by the receiver component of the carrier waveform transmitted by the remote controller; and
the provision or transmission of the control signal to the device by the apparatus is effectuated based on emission by the transmitter component of the carrier waveform.

14. The apparatus of claim 13, further comprising an enclosure configured to house one or more of the receiver component, the transmitter component, and the one or more physical processor apparatus;
wherein the context information conveys information related to an environment external to the enclosure.

15. The apparatus of claim 14 wherein:
the enclosure comprises a portion of a portable communications device selected the group consisting of a smartphone, a notebook computer, and a tablet computer; and
the apparatus is disposed within the enclosure.

16. The apparatus of claim 9, wherein the device comprises one or both of a household appliance or a toy.

17. The apparatus of claim 13, wherein:
the device comprises a robotic device configured to be operated by the user via the remote controller, the robotic device comprising one or more controllable actuators configured to operate in one or more degree of freedom; and
the context information comprises data related to a present configuration of the robotic device, the present configuration being determined substantially contemporaneously with the receipt of the carrier wave.

18. The apparatus of claim 9, wherein the context information is configured to relate a location of the device within an environment external to the apparatus.

19. The apparatus of claim 11, wherein the performance of the task is based on one or more movement actions performed by the device, the context information configured to convey data related to at least one of the one or more movement actions.

20. A remote control apparatus configured to be coupled to a robot, the apparatus comprising:
a transceiver apparatus;
a sensor module configured to determine information related to a state of the robot;
electronic storage; and
one or more physical processor apparatus configured to execute computer program instructions to cause the one or more physical processor apparatus to:
in response to an output by the sensor module, store, in the electronic storage, the information related to the state of the robot;

store, in the electronic storage, a first control command, the first control command configured to occur temporally proximate to the state; and
based on a determination that a current state of the robot matches the state, cause a provision of a second control command via the transceiver apparatus;
wherein the storage of the information related to the state of the robot and the first control command is configured to characterize a relationship between the state and the first control command and the provision of the second control command is based at least in part on the relationship; and
wherein the determination that the current state of the robot matches the state is made via a detection threshold.

21. The apparatus of claim 20, wherein the second control command comprises the first control command.

22. The apparatus of claim 20, wherein:
the first control command comprises a plurality of control instructions, individual ones of the plurality of instructions configured to cause the robot to execution portions of a task; and
the second control command comprises a sequence of control commands, individual commands of the sequence configured to cause the robot to execute the respective portions of the task, the second control command configured to cause the task execution in lieu of the first control command.

23. The apparatus of claim 20,
wherein the transceiver apparatus comprises a wireless receiver configured to receive a wireless transmission associated with the first control command provided by a user via wireless remote controller.

24. The apparatus of claim 23, wherein the wireless receiver is configured to receive a third control command provided by the user via the wireless remote, the third control command comprising a plurality of control commands, individual ones of the plurality of control commands being configured to cause the robot to perform an action.

25. The apparatus of claim 23, wherein the provision of the second control command is responsive to receipt of the first control command by the receiver.

26. The apparatus of claim 23, wherein the second control command is configured to modify the state of the robot.

27. The apparatus of claim 20, wherein the sensor module comprises a video camera.

28. The apparatus of claim 27, wherein the video camera is disposed on the robot and the information related to a state of the robot conveys data related to an environment external to the robot.

29. The apparatus of claim 20, wherein:
the provision of the second control command is responsive to execution of a supervised learning process by the one or more physical processor apparatus.

* * * * *